(12) United States Patent
O'Hora

(10) Patent No.: US 10,147,984 B2
(45) Date of Patent: *Dec. 4, 2018

(54) PORTABLE AND MODULAR ENERGY STORAGE FOR MULTIPLE APPLICATIONS

(71) Applicant: SynCells, Inc., Boston, MA (US)

(72) Inventor: Gerard O'Hora, Brighton, MA (US)

(73) Assignee: SYNCELLS, INC., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/621,364

(22) Filed: Jun. 13, 2017

(65) Prior Publication Data

US 2017/0279170 A1    Sep. 28, 2017

Related U.S. Application Data

(63) Continuation-in-part of application No. 15/225,620, filed on Aug. 1, 2016, now Pat. No. 9,680,188.

(Continued)

(51) Int. Cl.
*H01M 10/625* (2014.01)
*H01M 10/6568* (2014.01)
(Continued)

(52) U.S. Cl.
CPC ....... *H01M 10/625* (2015.04); *B60L 11/1816* (2013.01); *H01G 11/10* (2013.01);
(Continued)

(58) Field of Classification Search
CPC .................................................. H01M 10/625
(Continued)

(56) References Cited

U.S. PATENT DOCUMENTS 2,938,686 A    5/1960    Winkle et al.
5,756,227 A *  5/1998    Suzuki .................... F28F 3/02
                                                    429/120

(Continued)

FOREIGN PATENT DOCUMENTS

EP    2 876 702 A1    5/2015
KR    101146492 B1    5/2012
(Continued)

OTHER PUBLICATIONS

International Search Report and Written Opinion for PCT/US16/45048 dated Dec. 15, 2016, all pages.

(Continued)

*Primary Examiner* — Samuel Berhanu
*Assistant Examiner* — Tessema Kebede
(74) *Attorney, Agent, or Firm* — Kilpatrick Townsend & Stockton LLP

(57) ABSTRACT

A removable modular energy pack may include a first housing, and one or more energy cells. The modular energy pack may also include a processing system that aggregates power from the plurality of energy cells, and a first interface that communicates a status of the modular energy pack to a second housing. The modular energy pack may further include a second interface that transmits the aggregated power to the second housing, and a thermal material enclosed in the first housing. A thermal material may be arranged in the housing adjacent to the plurality of energy cells to transfer heat away from the plurality of energy cells and to transfer the heat to the second housing.

20 Claims, 24 Drawing Sheets

Related U.S. Application Data

(60) Provisional application No. 62/368,880, filed on Jul. 29, 2016, provisional application No. 62/199,835, filed on Jul. 31, 2015.

(51) Int. Cl.
| | |
|---|---|
| *H01M 10/6569* | (2014.01) |
| *H01M 10/44* | (2006.01) |
| *H01M 10/42* | (2006.01) |
| *H01M 10/0525* | (2010.01) |
| *H01M 10/613* | (2014.01) |
| *H01M 10/48* | (2006.01) |
| *H01M 2/10* | (2006.01) |
| *H01M 2/20* | (2006.01) |
| *H02J 7/00* | (2006.01) |
| *B60L 11/18* | (2006.01) |
| *H01G 11/10* | (2013.01) |
| *H01G 11/18* | (2013.01) |
| *H01G 11/82* | (2013.01) |
| *H01M 10/6567* | (2014.01) |
| *H01M 10/617* | (2014.01) |
| *H01M 10/655* | (2014.01) |
| *H02J 1/00* | (2006.01) |
| *H02J 7/34* | (2006.01) |
| *H02J 7/35* | (2006.01) |

(52) U.S. Cl.
CPC ........... *H01G 11/18* (2013.01); *H01G 11/82* (2013.01); *H01M 2/1005* (2013.01); *H01M 2/1077* (2013.01); *H01M 2/206* (2013.01); *H01M 10/0525* (2013.01); *H01M 10/425* (2013.01); *H01M 10/441* (2013.01); *H01M 10/486* (2013.01); *H01M 10/613* (2015.04); *H01M 10/617* (2015.04); *H01M 10/655* (2015.04); *H01M 10/6567* (2015.04); *H01M 10/6568* (2015.04); *H01M 10/6569* (2015.04); *H02J 7/0021* (2013.01); *H02J 7/0042* (2013.01); *H02J 7/0052* (2013.01); *H02J 7/0063* (2013.01); *H01M 2220/20* (2013.01); *H02J 1/00* (2013.01); *H02J 7/345* (2013.01); *H02J 7/35* (2013.01); *H02J 2001/004* (2013.01); *Y02E 60/122* (2013.01); *Y02E 60/13* (2013.01)

(58) Field of Classification Search
USPC ........................................................ 320/128
See application file for complete search history.

(56) References Cited

U.S. PATENT DOCUMENTS

| | | | |
|---|---|---|---|
| 6,122,603 A | 9/2000 | Budike, Jr. | |
| 7,059,769 B1* | 6/2006 | Potega | B60L 11/1861 338/22 R |
| 7,949,435 B2 | 5/2011 | Pollack et al. | |
| 8,359,112 B2 | 1/2013 | Kephart et al. | |
| 8,406,477 B2 | 3/2013 | Chen et al. | |
| 8,473,111 B1 | 6/2013 | Shankar et al. | |
| 8,816,870 B2 | 8/2014 | Plaisted et al. | |
| 8,830,676 B2* | 9/2014 | Borck | H01M 2/1061 165/104.33 |
| 8,865,337 B2 | 10/2014 | Culver et al. | |
| 8,907,811 B2 | 12/2014 | Windstrup et al. | |
| 9,300,141 B2 | 3/2016 | Marhoefer | |
| 9,434,270 B1 | 9/2016 | Penilla et al. | |
| 9,438,573 B2 | 9/2016 | Cregg | |
| 9,680,188 B2 | 6/2017 | O'Hora | |
| 9,711,989 B2 | 7/2017 | Shin et al. | |
| 9,716,718 B2 | 7/2017 | Belton et al. | |
| 9,817,376 B1 | 11/2017 | Wartena et al. | |
| 9,819,060 B2 | 11/2017 | O'Hora | |
| 2002/0136042 A1 | 9/2002 | Layden et al. | |
| 2003/0099883 A1* | 5/2003 | Ochoa | B82Y 30/00 429/232 |
| 2005/0007042 A1 | 1/2005 | Moore et al. | |
| 2006/0276938 A1 | 12/2006 | Miller | |
| 2007/0127346 A1 | 6/2007 | Goodman et al. | |
| 2007/0181547 A1 | 8/2007 | Vogel et al. | |
| 2007/0267999 A1 | 11/2007 | Buckley et al. | |
| 2008/0072289 A1 | 3/2008 | Aoki et al. | |
| 2008/0197199 A1 | 8/2008 | Terlizzi et al. | |
| 2009/0096416 A1 | 4/2009 | Tonegawa et al. | |
| 2009/0251925 A1 | 10/2009 | Usui et al. | |
| 2010/0007515 A1 | 1/2010 | Ito | |
| 2010/0017045 A1 | 1/2010 | Nesler et al. | |
| 2010/0104927 A1* | 4/2010 | Albright | H01M 2/0242 429/50 |
| 2010/0104935 A1* | 4/2010 | Hermann | H01M 10/502 429/120 |
| 2010/0245103 A1 | 9/2010 | Plaisted et al. | |
| 2010/0315197 A1 | 12/2010 | Solomon et al. | |
| 2011/0014501 A1 | 1/2011 | Scheucher | |
| 2011/0204720 A1 | 8/2011 | Ruiz et al. | |
| 2011/0234165 A1 | 9/2011 | Palatov | |
| 2011/0261057 A1 | 10/2011 | Freyhult et al. | |
| 2011/0302078 A1 | 12/2011 | Failing | |
| 2012/0039503 A1 | 2/2012 | Chen et al. | |
| 2012/0169511 A1 | 7/2012 | Windstrup et al. | |
| 2013/0026972 A1 | 1/2013 | Luke et al. | |
| 2013/0059182 A1 | 3/2013 | Komatsu et al. | |
| 2013/0164567 A1* | 6/2013 | Olsson | H01M 10/488 429/7 |
| 2013/0166081 A1 | 6/2013 | Sanders et al. | |
| 2013/0205372 A1 | 8/2013 | Gilbert et al. | |
| 2013/0214763 A1 | 8/2013 | Kubota et al. | |
| 2013/0288083 A1 | 10/2013 | Sweetland et al. | |
| 2013/0297084 A1 | 11/2013 | Kubota et al. | |
| 2014/0015469 A1 | 1/2014 | Beaston et al. | |
| 2014/0136007 A1 | 5/2014 | Williams | |
| 2014/0336837 A1 | 11/2014 | Kiuchi et al. | |
| 2014/0377623 A1 | 12/2014 | Pyzza et al. | |
| 2015/0037649 A1* | 2/2015 | Wyatt | H01M 10/625 429/120 |
| 2015/0042285 A1 | 2/2015 | Doerndorfer | |
| 2015/0048684 A1 | 2/2015 | Rooyakkers et al. | |
| 2015/0056475 A1 | 2/2015 | Adrian et al. | |
| 2015/0073608 A1 | 3/2015 | Ippolito et al. | |
| 2015/0261198 A1 | 9/2015 | Rice | |
| 2015/0333512 A1 | 11/2015 | Saussele et al. | |
| 2015/0350818 A1 | 12/2015 | Hammett et al. | |
| 2016/0003918 A1 | 1/2016 | Wada et al. | |
| 2016/0033946 A1 | 2/2016 | Zhu et al. | |
| 2016/0093843 A1 | 3/2016 | Reineccius et al. | |
| 2016/0093848 A1* | 3/2016 | Dekeuster | H01M 2/1077 429/71 |
| 2016/0094056 A1 | 3/2016 | Dulle | |
| 2016/0129801 A1 | 5/2016 | Gale et al. | |
| 2016/0329710 A1 | 11/2016 | Clifton | |
| 2017/0033337 A1 | 2/2017 | O'Hora | |
| 2017/0033338 A1 | 2/2017 | O'Hora | |
| 2017/0033408 A1 | 2/2017 | O'Hora | |
| 2017/0085438 A1 | 3/2017 | Link et al. | |
| 2017/0242411 A1 | 8/2017 | Papadopoulos | |

FOREIGN PATENT DOCUMENTS

| | | |
|---|---|---|
| WO | 2014/207658 A1 | 12/2014 |
| WO | 2017/023869 A1 | 2/2017 |

OTHER PUBLICATIONS

International Preliminary Report on Patentability for PCT/US16/45048 dated Feb. 6, 2018, all pages.
U.S. Appl. No. 15/225,620, filed Aug. 1, 2016, Non-Final Rejection dated Nov. 9, 2016, all pages.

(56) References Cited

OTHER PUBLICATIONS

U.S. Appl. No. 15/225,680, filed Aug. 1, 2016, Pre-Interview first office action dated Nov. 30, 2016, all pages.
U.S. Appl. No. 15/225,680, filed Aug. 1, 2016, First Action Interview dated Mar. 27, 2017, all pages.
U.S. Appl. No. 15/225,656, filed Aug. 1, 2016, Non-Final Rejection dated Nov. 30, 2016, all pages.
U.S. Appl. No. 15/621,268, filed Jun. 13, 2017, Non-Final Rejection dated Jan. 24, 2018, all pages.
MBEAM, "The Modular Battery Exchange System: A Common Sense Approach to Full Adoption of Clean Electric Transportation," 10 pages. Retrieved from http://www.modularexchange.com/?page_id=141 Accessed on Jul. 1, 2016.
MBEAM, "First Updated Module," 18 pages. Retrieved from http://www.modularexchange.com/?p=314 Access on Jul. 1, 2016.
International Search Report and Written Opinion for PCT/US18/37258 dated Jul. 3, 2018, 11 pages.

* cited by examiner

PORTABLE AND MODULAR ENERGY STORAGE FOR MULTIPLE APPLICATIONS

CROSS-REFERENCES TO RELATED APPLICATIONS

This application is a continuation-in-part of U.S. patent application Ser. No. 15/225,620 filed on Aug. 1, 2016, which is incorporated herein by reference. U.S. patent application Ser. No. 15/225,620 claims the benefit of U.S. Provisional Patent Application No. 62/199,835 filed on Jul. 31, 2015, which is incorporated herein by reference. U.S. patent application Ser. No. 15/225,620 also claims the benefit of U.S. Provisional Patent Application No. 62/368,880 filed on Jul. 29, 2016, which is incorporated herein by reference.

This application is related to U.S. patent application Ser. No. 15/621,268 filed on Jun. 13, 2017 entitled "Energy Virtualization Layer for Commercial and Residential Installations" by Gerard O'Hora, which is incorporated herein by reference.

BACKGROUND

The technology revolution of the past two decades has led to many changes—from the Internet and social media to mobile phones and tablets. What often gets overlooked are the indirect developments that technology has enabled. Small, power-hungry devices forced research into new battery chemistries such as lithium-ion in the 2000s, and now chemistries are emerging that offer ten times the performance. Technology is enabling the green movement through the Internet of Things (IoT) and the sensors, monitoring, and management capabilities it affords. Technology is also enabling the automotive industry to develop new vehicle platforms that are cleaner, faster, require less maintenance, and soon may not even require a driver. Finally, technology is enabling the energy and utility industries to migrate from fossil-fuel power plants and their clients to avail of more efficient and effective delivery and transmission methods. These industries are now converging around a unifying concept: energy storage and Energy as a Service (EaaS).

BRIEF SUMMARY

In some embodiments, a removable modular battery pack may include a first housing, and one or more energy cells enclosed in the first housing. The modular energy pack may also include a processing system enclosed in the housing that aggregates power from the one or more energy cells. The modular energy pack may additionally include a first interface that communicates a status of the modular energy pack to a second housing. The second housing may be configured to removably receive a plurality of modular energy packs. The modular energy pack may further include a second interface that transmits the aggregated power from the one or more energy cells from the processing system to the second housing, and a thermal material enclosed in the first housing. The thermal material may be arranged in the housing adjacent to the one or more energy cells to transfer heat away from the one or more energy cells and to transfer the heat to the second housing.

In some embodiments, the aggregated power from the plurality of battery cells may be transmitted to a motor of an electric or hybrid electric vehicle. The thermal material may include a thermally conductive fluid. The battery pack may include an first inlet valve that mates with a first outlet valve on the second housing where the thermally conductive fluid is pumped from the second housing into the first inlet valve, and a second outlet valve that mates with a second inlet valve on the second housing where the thermally conductive fluid is pumped from the modular battery pack through the second outlet valve to the second housing. The processing system may include a temperature sensor; and the processing system may control a flow of the thermally conductive fluid into the first housing based on temperature readings received from the temperature sensor. The thermal material may include a nonconductive extinguishing agent. The plurality of battery cells may be grouped in a plurality of battery sub-modules that are individually packaged within the first enclosure. Each of the plurality of battery sub-modules may include a processor that communicates with the processing system of the modular battery pack. The battery pack may also include tubing that is routed adjacent to each of the plurality of battery sub-modules, where the thermal material flows through the tubing.

In some embodiments, a method of providing power through a modular energy pack may include inserting the modular energy pack into a second housing. The second housing may be configured to removably receive a plurality of modular energy packs. The method may also include communicating, through a first interface of the modular energy pack, a status of the modular energy pack to the second housing. The method may additionally include aggregating, through a processing system of the modular energy pack, power from a plurality of energy cells enclosed in the first housing. The method may further include providing, through a second interface of the modular energy pack, the aggregated power from the plurality of energy cells from the processing system to the second housing. The aggregated power from the one or more energy cells may be transmitted from the second housing to power a load that is external to the second housing. The method may also include transferring heat away from the plurality of energy cells using a thermally conductive material enclosed in the first housing. The thermally conductive material may be arranged in the housing adjacent to the one or more energy cells to transfer heat away from the one or more energy cells and to transfer the heat to the second housing. The second housing may include a thermally conductive fluid that is circulated around the modular energy pack to absorb the heat transferred from the modular energy pack and transfer the heat away from the modular energy pack.

In any embodiments, any of the following features may be included in any combination and without limitation. The thermally conductive material may include an electrolyte. The one or more energy cells may include an anode and a cathode, and the electrolyte may flow from the second housing into the first housing between the anode and the cathode. The second housing may include a plurality of openings, at least one of which is sealed by a blanking plate. A layer of carbon nanotubes or graphene may be disposed between the first housing and the second housing. The modular energy pack may include an electronic screen that displays status information from the one or more energy cells. The second housing may be flooded with the thermally conductive fluid when the modular energy pack is inserted into the second housing, and the second housing may be drained of the thermally conductive fluid before the modular energy pack is removed from the second housing. The aggregated power from the one or more energy cells may be transmitted to a motor of an electric or hybrid electric vehicle. The energy pack may include a first inlet valve that mates with a first outlet valve on the second housing, where the thermally conductive fluid may be pumped from the second housing into the first inlet valve; and a second outlet valve that mates with a second inlet valve on the second housing, where the thermally conductive fluid may be pumped from the modular energy pack through the second outlet valve to the second housing.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1:
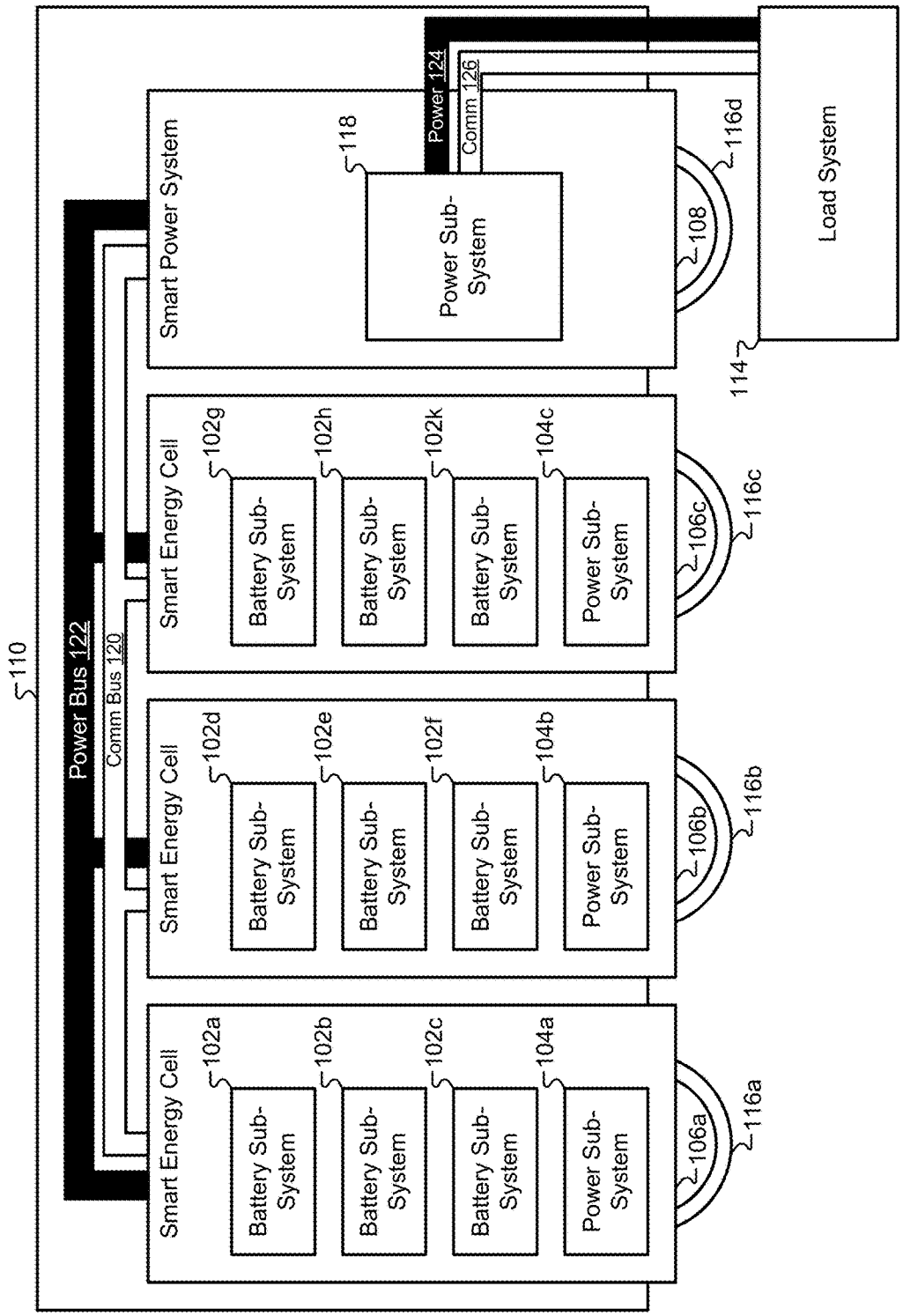
FIG. 1 illustrates a power system that includes removable modular battery packs, according to some embodiments.

Described herein, are embodiments for an energy solution including an energy storage module as part of a modular energy platform and ecosystem that allows the evolving hybrid car and electric vehicle (EV) industry, along with many other industries, to overcome their current battery limitations. Specifically, rather than waiting for an EV to recharge, users can swap out the energy cell modules and be back on the road in possibly less time than it would take to fill an average gas tank. The energy modules may be similar in practice to rechargeable batteries, but may be constructed in a unique manner that allows for high energy density (e.g., on the order of 1 kWh or greater per 10 lb cell or more) using a modular, removable package. This power system is unique in that the energy cell modules may be used across a variety of industries and applications.

In some embodiments, a home charging station can use a standard household outlet to charge multiple energy modules since the charging window may be extended significantly compared to the power demands of charging a vehicle directly. When returning from a trip, users can swap spent energy modules from an EV with fresh energy modules from the home charging station instead of waiting for a non-removable battery to recharge. This same concept can be applied to commercial sites, traditional gas stations, and other available sites. A commercial charging station can store and charge batteries, and through either an automated kiosk setup or a traditional attendant setup, users can swap their spent energy modules with freshly charged units. Unlike traditional gas stations that require large forecourts, storage tanks, special permitting, and environmental challenges, these kiosks that can be sized to occupy less than a standard parking spot can sit in urban areas as self-serve fuel stops. For a Commercial Real Estate (CRE) location, these stations can also support a building's emergency power needs along with providing a service to their tenants.

This distributed energy storage platform, which can be located in homes, commercial locations, fuel stations, and more, can be an integral part of a utility's demand response (DR) solution. The energy stored in the removable, modular battery packs can flow back into the grid when required, either during peak load or service outages. They can also support the individual site's power needs, thereby offsetting the peak load demand usage.

The embodiments described herein provide the same energy storage capacity as found in an EV in a package that weighs 800 lbs or less. One benefit of these embodiments is to package these technologies into Smart Energy Cells (SECs) that range from 5-40 lbs, depending on their application, with a 10 lb module being one module size for the typical EV. This provides a manageable weight that an average person can lift to swap modules. Since these SECs make the vehicle significantly lighter, it can achieve higher miles/kW, allowing for greater distance, less battery capacity, or both. This appeals to people who previously shunned EVs because of performance concerns.

In one embodiment, a SEC will deliver an approximate 48V output and between 1-20 kWh capacity, or more. The 48V output is corresponds to an operating voltage for most communications infrastructures and other systems, and would thus increase the number of compatible applications. Using multiples of that voltage, these embodiments can achieve a normalized 120/240 VAC for both residential and commercial applications, and a 336 VDC for the typical EV motor. However, other specific voltages may be achieved using the architecture described below.

Each SEC can be constructed by using a common chassis physical envelope that incorporates cooling capabilities, electronics, electrical connections, and/or other components. The battery submodules may contain battery cells or supercapacitors that can vary according to evolving battery technologies, including lithium ion-sulphur, carbon nanotubes, or potentially even next generation fuel-cells. Furthermore, the chassis and associated components, may act in reverse—rather than receiving power from an energy module, they may deliver power and communications to a module in a standardized fashion while cooling said modules and rejecting any heat buildup from the electronic activities occurring therein. These energy receiving modules may perform a variety of functions, from monitoring and control, to networking and computing, either for functions associated with the energy platform, or those networked with it.

FIG. 1 illustrates a power system that includes removable modular battery packs, according to some embodiments. The system includes a plurality of smart energy cells (SECs) 106. Throughout this disclosure, the SECs 106 may be referred to as "modular battery packs," "removable modular battery packs," and/or "energy modules," and these terms may be used interchangeably. The SECs 106 represent the basic energy storage components of the power system that allow for the removal and transfer of energy storage from devices and systems that consume power, in contrast to existing batteries, for example, for electric vehicles that are fixed in location and arrangement and require special operations to move or replace.

Each SEC may include one or more battery subsystems 102. Throughout this disclosure, the battery subsystems 102 may also be referred to as "battery submodules (BSM)," and these terms may be used interchangeably. The battery submodules provide a standardized structure/framework to support one or more energy storage devices, such as battery cells or super capacitors. Each SEC may also include a power subsystem 104. The power subsystem 104 may also be referred to as a "communication submodule (CSM)," and these terms may be used interchangeably. The power subsystems 104 provide a standardized means to aggregate all of the electrical connections in the SEC and provide a standardized output. The power subsystems 104 also manage communications between each of the battery subsystems 102 and the rest of the power system.

Each SEC may also include a housing, referred to herein as a "first housing," and/or a handle 116. The handle 116 and the housing combine to make each SEC a removable, modular unit that can be readily removed from the power system by a user and replaced with a similar SEC. In some embodiments, the handle 116 on each SEC can be used to carry the SEC, and to lock the SEC in place within the power system by turning or depressing the handle 116 when the SEC is inserted.

The power system may include a smart enclosure (SE) 110, which may also be referred to herein as a "second housing" to distinguish it from the first housing of the SECs. The smart enclosure 110 may include a power bus that links the power provided by each of the SECs to a smart power system 108. The smart enclosure 110 may also include a communication bus 120 that communicatively couples each of the SECs to the smart power system 108. The smart enclosure 110 provides a containment unit and structure to support a number of SECs along with their respective electrical connections. The smart enclosure 110 provides physical and electrical couplings that hold the SECs in place and connect the SECs to the rest of the power system.

The power system may also include a smart power system 118, which may also be referred to herein as a "smart power module (SPM)" and/or a "power module (PM)." The smart power system 108 may include a power subsystem 118 that is similar to the power subsystems 104 of the SECs 106. The power subsystem 118 of the smart power system 108 may also include a housing and handle 116 that is similar to those of the SECs 106. Therefore, the smart power system 108 may have a physical form factor that is similar to or identical to the SECs 106. The power subsystem 118 of the smart power system 108 can communicate with each of the SECs 106 to authenticate their identity and thereby enable the SECs 106 to transmit power to the smart power system 108. The power subsystem 118 can also communicate with the power subsystems 104 of the SECs 106 to identify the electrical characteristics of each of the SECs 106. The power subsystem 118 can then aggregate the power provided by each SEC and generate a waveform (e.g., VDC, VAC, etc.) corresponding to a set of stored parameters in the power subsystem 118. The generated waveform can be transmitted via a power output 124 through the smart enclosure 110 to a load system 114. The load system 114 can, for example, include electric vehicles, consumer and/or residential electrical systems, power grids, and/or the like. Additionally, the power subsystem 118 can include a communication output 126 to provide status, diagnostic, historical, and/or command information to/from the load system 114.

FIG. 1 represents a general overview of the power system described herein. The remainder of this disclosure will describe each of the components and subsystems described above in greater detail. FIG. 1 also represents only one embodiment of many possible embodiments described below. Many different configurations, battery chemistries, physical arrangements, electrical circuits, and so forth, may be used in addition to those described specifically above.

In some embodiments, electrical battery technologies may be replaced with fuel cell technologies. For example, the SEC's 106 may be replaced by fuel cells. The backplane of the smart enclosure 110 may perform a similar function wherein it aggregates electrical power and/or provides a routing system to flow cooling fluid to or through the individual fuel cells. In some cases, a fuel-cell may be physically larger than an SEC 106, and may be larger than can be accommodated in the existing cutouts of a smart enclosure 110. Therefore, some smart enclosures 110 may include alternate front and/or back plates that can be installed to accommodate the larger sizes that may be typical of fuel cells.

For example, one embodiment of a smart enclosure 110 may include four sides (e.g., top, bottom, left, and right) with an open front and/or back. A modular backplane can be installed at the back of the smart enclosure to accommodate the different materials that need to be cycled through the fuel cells. Some embodiments may include an air supply, a fuel source (e.g., gas, natural gas, oil, etc.) a low-temperature cooling path, a high-temperature cooling path, wastewater expulsion, and/or electrical or communication interfaces. As will be described in greater detail below, some embodiments of the smart enclosure 110 may include a front plate that can be sealed when the SEC's 106 and/or fuel cells are inserted and locked in place. When the front and back are sealed and the fuel cells are in place, the remaining volume of the smart enclosure 110 can be flooded with cooling liquid. Thus, the fuel cells can be bathed in coolant to remove the higher temperatures (e.g. 600° C.) that may be generated by active fuel cells. The backplane of the smart enclosure 110 may include all of the supply/return lines required for each installed fuel-cell.

Some embodiments, the smart enclosure 110 may part of an integrated hyper-converged platform allows for a combination of energy storage, energy generation, energy management, and so forth, under one physical platform and user interface. For example, fuel cells and/or batteries may be removed from one smart enclosure 110 that is used to power a vehicle, and placed in a second smart enclosure 110 that is used to provide power for a computer system, a home or living quarters, a forward operating base, and so forth. Furthermore, the cooling system of the smart enclosure 110 may be integrated with existing utilities. For example, the high temperature loop that floods the smart enclosure 110 may be routed through a large heat exchanger and used to drive industrial processes. A low temperature coolant loop (e.g. 200° C.) may be used to supply a hot-water heater for a residential and/or commercial building.

Figure 2:
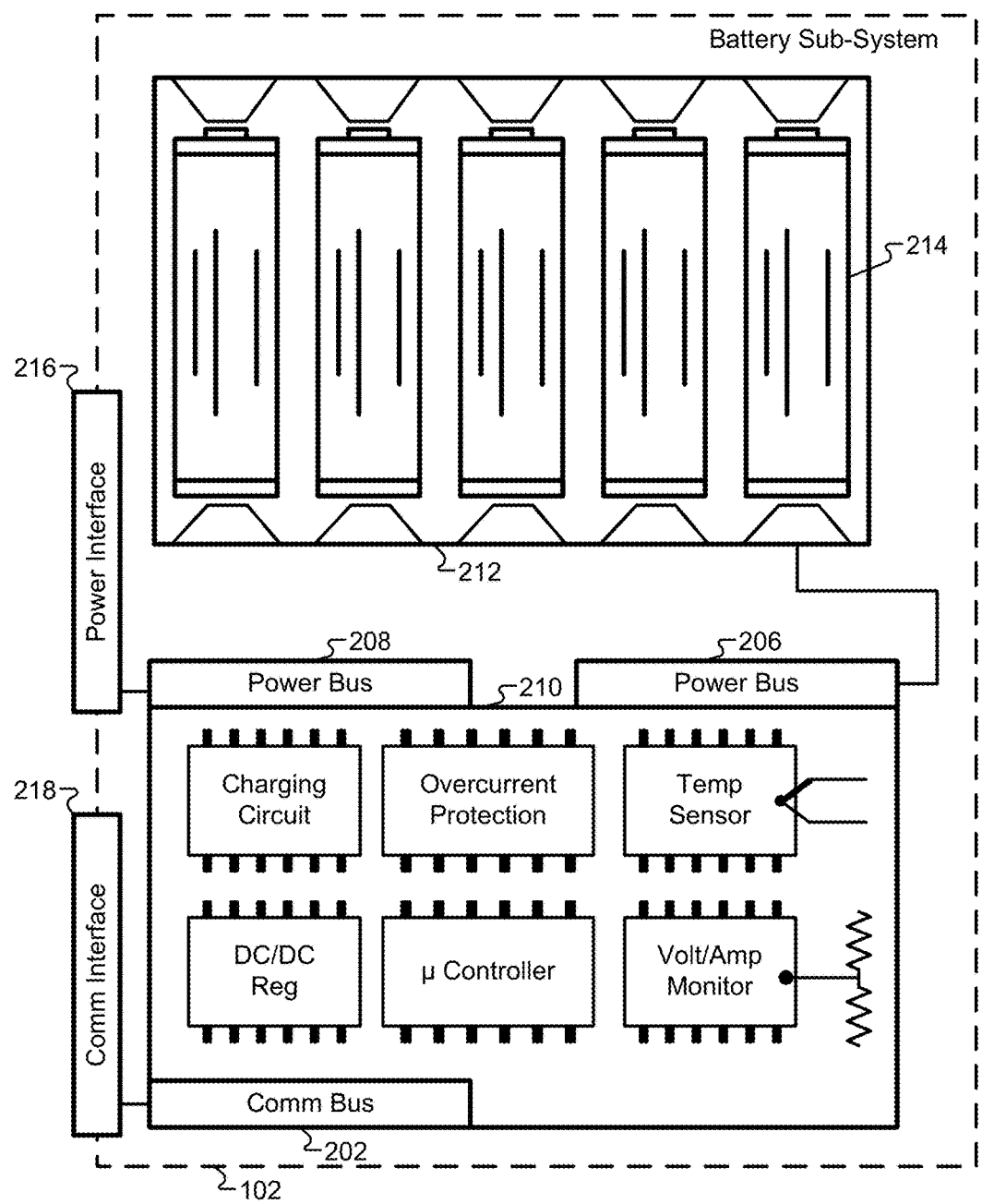
FIG. 2 illustrates a simplified diagram of a battery subsystem, according to some embodiments.

FIG. 2 illustrates a simplified diagram of a battery subsystem 102, according to some embodiments. Each SEC may include a plurality of battery cells that are used to store and provide electrical power. The plurality of battery cells may be divided into a plurality of groups that can be managed as groups. These groups are represented by the battery subsystem 110. In some embodiments, each SEC may include seven battery subsystems 102, or between five and nine battery subsystems 102.

The battery subsystem may include a plurality of individual battery cells 214. In some embodiments, the individual battery cells may be implemented using lithium-ion 18650 battery cells. In other embodiments, the individual battery cells may also include other storage technologies, such as super capacitors. The battery subsystem 102 may include mechanical supports that secure the batteries, either through friction fit or a clamping mechanism. Springs or solder connections may also be used to secure the battery cells 214 within the battery subsystem 102. In one embodiment, each battery subsystem 102 may include 13 lithium-ion 18650 batteries, or between 10 and 16 lithium-ion batteries.

The battery subsystem 102 may include a physical housing that mechanically fastens to the internal structure of the SEC. The housing may protect the battery cells 214 and keep them fixed in place. In some embodiments, the housing of the battery subsystem 102 may be a rectangular cube such that each of the battery subsystems 102 in the SEC can be inserted adjacently within a rectangular cube housing of the SEC. In some embodiments, the battery subsystem 102 may incorporate or be constructed using an intumescent material for fire protection.

In addition to providing a physical connection for the plurality of battery cells 214, the battery subsystem 102 may also include a processing system 210 that electrically and/or communicatively couples the battery subsystem 102 to the power subsystem of the SEC. A power bus 206 can receive the power provided from the battery cells 214, and the processing system 210 can perform various functions on the received power. In some embodiments, the processing system may include an overcurrent protection ship that protects the battery cells 214 and the rest of the processing system 210 when both charging and discharging the battery cells 214. The processing system 210 may also include a microcontroller that communicates through a communication bus 202 and communication interface 218 in the housing of the battery subsystem 201 with the rest of the SEC. The microcontroller can control the state of the battery subsystem 102 with regards to charging and discharging.

The power system 210 may also include a second power bus 208 and a power interface 216 in the housing of the battery subsystem 102. In some embodiments, the power bus 208 may be replaced with a dedicated wired connection between the SEC and the smart power system 108. The power interface 216 can both receive power from the SEC and provide power to the SEC depending on the state of the processing system 210. During a charging state, a charging circuit can receive power through the power interface 216 and charge the battery cells 214. During a discharging state, the processing system 210 can receive power from the battery cells 214 and use a DC/DC regulator to provide clean power to the power interface 216. The power interface 216 can connect to internal power rails of the SEC, which can be combined to provide the overall electrical output of the SEC. The output from each battery subsystem 102 may be controlled by the power subsystem of the SEC that governs the status, performance, and functionality of the SEC.

In some embodiments, the processing system 210 may also include a memory that stores lifecycle information for the battery cells 214 and/or for the battery submodule 102 specifically. The memory can store a number of charge/discharge cycles that the battery cells 214 have undergone. The memory can also store specific voltage/current capabilities of the power cells 214 and of the battery subsystem 102 as a whole. The memory can store a serial number or other identification number for the battery subsystem 102. The microcontroller can transmit the serial number through the communication interface 218 to the power subsystem of the SEC, which can then use the serial number to determine the electrical characteristics of the battery cells 214. For example, lithium-ion batteries may have a longer lifetime than super capacitors, but may charge more slowly. These electrical characteristics can be considered by the microcontroller when governing the operations of the charging circuit. In some embodiments, battery management and monitoring capabilities may be used to auto-detect the chemistries of the connect the battery cells. In these embodiments, the processing system 210 can predict the remaining lifecycle of the battery cells 214.

In some embodiments, the processing system 210 may also include state of health sensors that provide a real-time status of the battery subsystem 102. For example, some embodiments may include a temperature sensor that monitors the temperature of the battery cells 214. As battery cells are discharged, they often generate excessive heat that can damage the battery cells 214 and/or the processing system 210. As will be described below in greater detail, the battery subsystem 102 may include an integrated cooling system that is configured to extract heat from the battery cells 214 and transfer the heat to the smart enclosure (second housing) of the power system. The temperature sensor of the processing system 210 can monitor the temperature of the battery cells 214 in real time. The microcontroller can then communicate with the power subsystem of the SEC to regulate the flow of coolant through the SEC and/or the battery subsystem 102. For example, when the temperature increases according to the temperature sensor, the microcontroller can request coolant to flow at a higher rate through the battery subsystem 102 and/or the SEC. Conversely, when the temperature decreases or is below an optimal operating temperature, the microcontroller can request coolant to flow at a lower rate through the battery subsystem 102 and/or the SEC. Some embodiments may also include electrical heating coils in the battery subsystem 102 that can be used to heat the battery cells 214 in cold environments.

Figure 3:
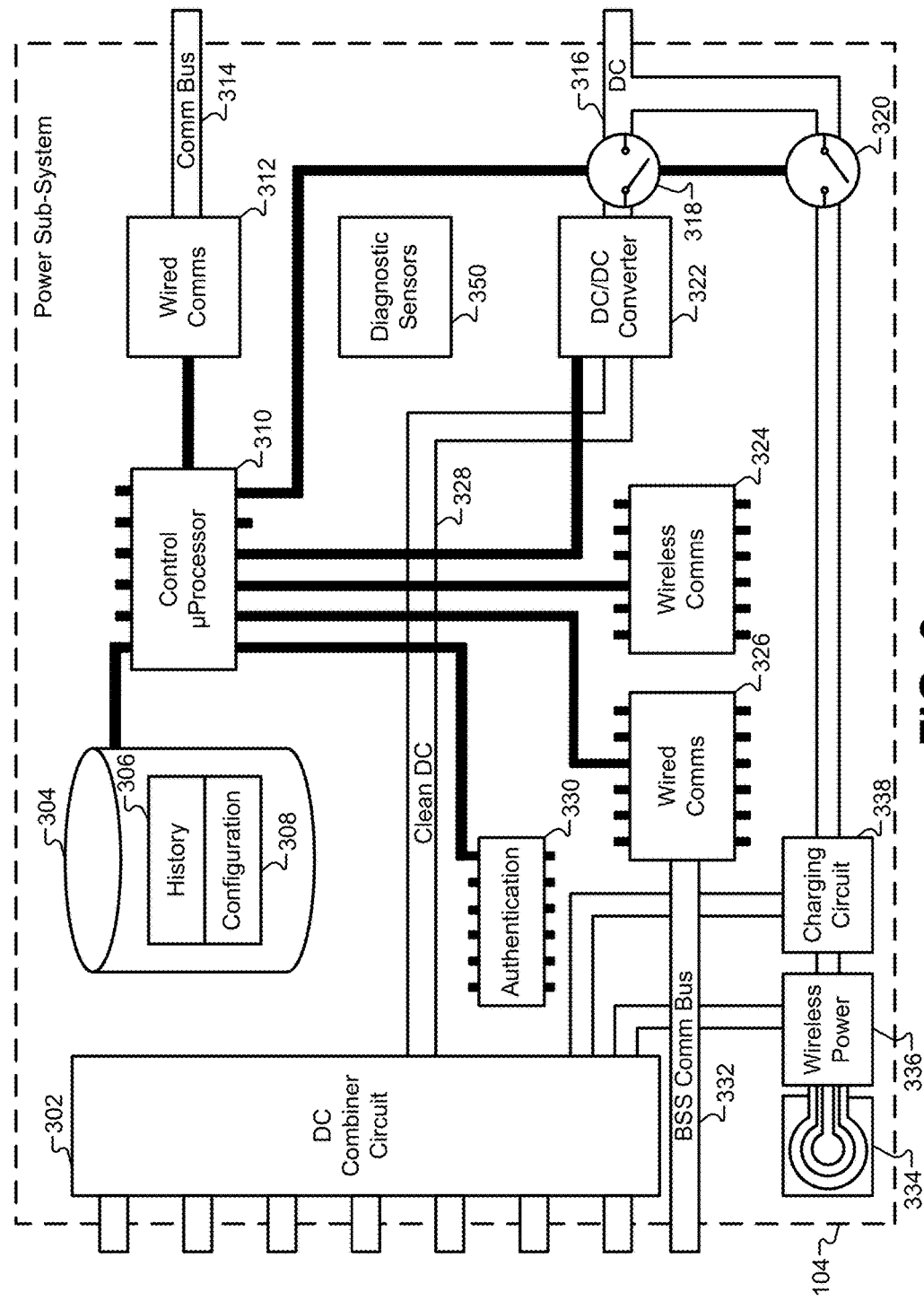
FIG. 3 illustrates a power subsystem of a SEC, according to some embodiments.

FIG. 3 illustrates a power subsystem 104 of a SEC, according to some embodiments. The power subsystem 104 provides a standardized means to aggregate all of the electrical connections and provide monitoring and control of the power flow from each of the battery subsystems in the SEC. First, the power subsystem 104 may include a DC combiner circuit 302 that is electrically coupled to the power interface 216 of each of the battery subsystems in the SEC. The DC combiner circuit can combine each of the DC voltages from the battery subsystems into a DC signal 328 using a ladder of diode-connected circuits.

In some embodiments, a DC/DC converter 322 can be programmed to provide varying levels of DC voltage to the rest of the power system. In some embodiments, the DC/DC converter 322 can provide a 48 V, 45 A signal to a DC port 316. In these embodiments, the native output of each of the battery subsystems may also be 48 V. The DC/DC converter 322 can be programmed, in the case of a failure, to simply provide the raw voltage from the DC combiner circuit 302 to the DC port 316.

The DC port 316 can also receive AC or DC voltage from the power system, which can be used to charge the battery subsystems in the SEC. Switches 318, 320 can be controlled by a microprocessor 310 to change the state of the SEC from a discharging mode to a charging mode. A charging circuit 338 can selectively provide charging power to each of the battery subsystems individually. For example, a particular battery subsystem in the SEC may have discharged more rapidly than the rest, and the charging circuit 338 can direct the power received through the DC port 316 to that particular battery subsystem. In some embodiments, the DC port 316 may include a wired two-pole output connection (+/−) that can be connected in serial/parallel with other SECs.

Some embodiments may also include a wireless power interface to transmit power to the rest of the power system. The power subsystem 104 may include one or more receiving/transmitting coils 334 connected to a wireless power circuit 336. The wireless power circuit 336 can transmit power from the DC combiner circuit 302 or from the DC/DC converter 322 during a discharging state. The wireless power circuit 336 can also receive power that is delivered to the charging circuit 338 during a charging state.

The power subsystem may also include various communication devices that are used to communicate with both the battery subsystems and the rest of the power system external to the SEC. A battery subsystem to communication bus 332 can be connected to a wired communication chip 326 and used to communicate status/state information to/from each of the individual battery subsystems. Additionally or alternatively, the power subsystem 104 may include a wireless communication chip 324, such as a Bluetooth chip, a Wi-Fi chip, and/or the like. The wireless communication chip 324 can be used to communicate with the individual battery subsystems. In some embodiments, both the wired communication chip 326 and the wireless communication chip 324 may be provided, one serving as a backup system to the other.

The wireless communication chip 324 may also be used to communicate with the rest of the power system. For example, the wireless communication chip 324 can communicate with the power subsystem 118 of the smart power system 108 of FIG. 1. Additionally or alternatively, a wired communication chip 312 can communicate via a second wired bus 314 that is shared with other SECs when communicating with the smart power system 108.

The processor 310 can be communicatively coupled to a memory 304 that stores historical information 306 and configuration information 308 for each of the battery subsystems in the SEC. The historical information 306 may include a number of charge/discharge cycles over the lifetime of each battery subsystem, charge/discharge times, times since the last charge, discharge/charge rates, manufacturing dates, expiration information, and so forth. The configuration information 308 may include serial numbers and identification numbers, battery/energy cell types, numbers of battery/energy cells, voltage outputs, maximum currents, temperature operating ranges, and so forth.

In some embodiments, the power subsystem 104 can require authentication information to be verified before power is transmitted through the DC port 316. Switch 318 can be opened until proper authentication information is validated. For example, cryptographic keys and/or signatures may be exchanged between the power subsystem 104 and the smart power system 108 of FIG. 1. An authentication module 330 can perform algorithms that would be known to one having skill in the art to verify that the power subsystem 104 is authorized to provide power through the DC port 316. Handshake information comprising serial number identification and status/state information can be exchanged before the power subsystem 104 allows power to flow through the DC port 316. This authentication feature can be used to prevent theft and enforce lifecycle requirements on the SEC. Because the SECs are designed to be modular and removable, these security features may be beneficial. In some embodiments, the diagnostic systems of the power subsystem 104 and of each of the battery subsystems can detect failures or voltages/currents that are outside the normal operating range. In the case of a failure, the processor 310 can open switches 318, 322 to disable the SEC and prevent the SEC from being used. The switches 318, 322 can also be closed to prevent power flowing from the SEC when the number of charge cycles for the SEC surpasses a threshold, when a battery voltage dips below a threshold voltage, or when the malfunction is detected in the SEC.

Figure 4:
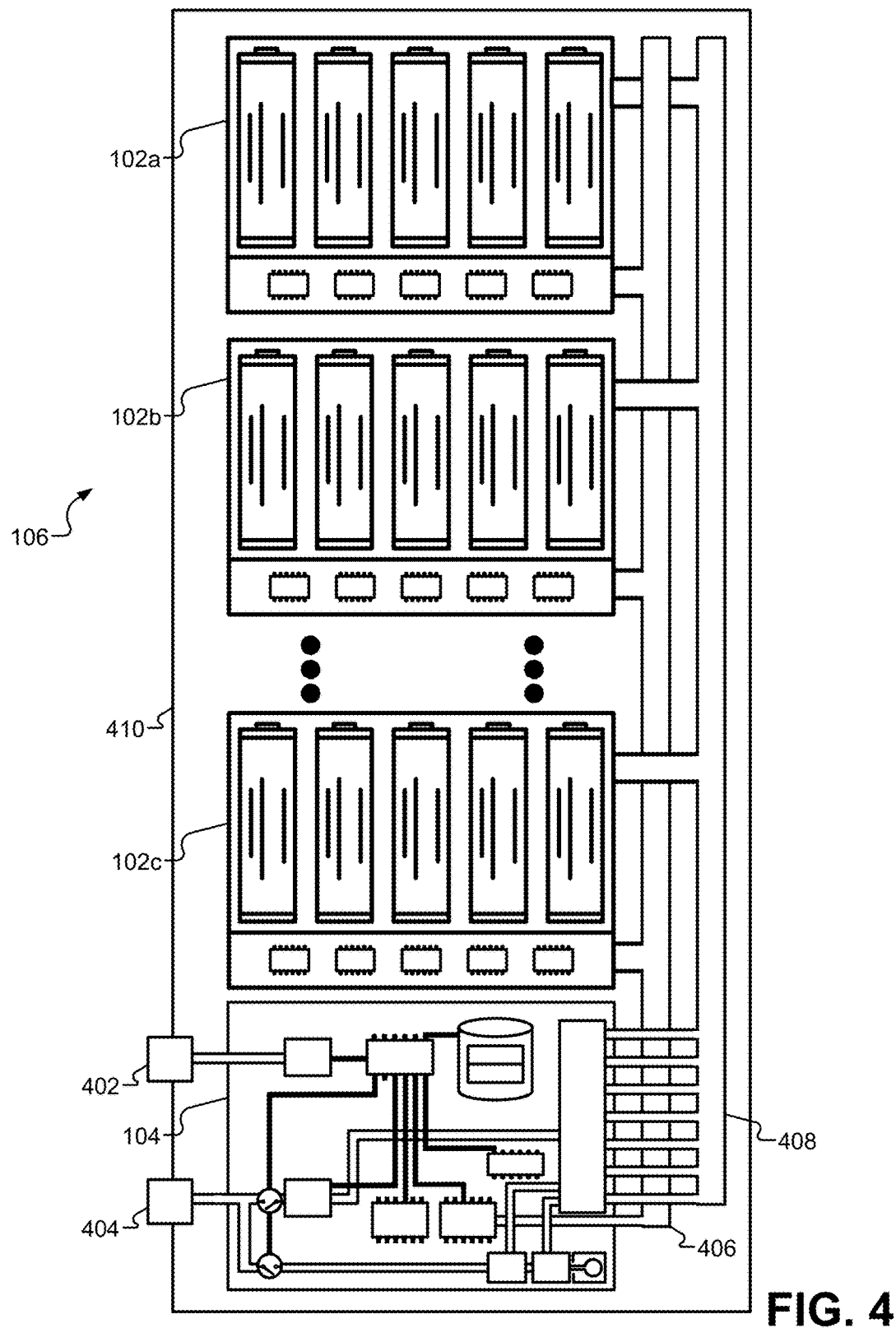
FIG. 4 illustrates a SEC, according to some embodiments.

FIG. 4 illustrates a SEC, according to some embodiments. The SEC includes a plurality of battery subsystems 102 (102*a*, 102*b*, 102*c*, etc.), each of which includes a plurality of individual battery cells and a processing system as described above in relation to FIG. 2. The SEC may also include a power subsystem 104 as described in relation to FIG. 3. A power bus 408 can electrically couple each of the battery subsystems 102 with the power subsystem 104. Note that in some embodiments, the power bus 408 may have dedicated connections between each battery subsystem and an individual DC port on the power subsystem 104. Additionally, a communication bus 406 can communicatively couple each of the battery subsystems 102 to the power subsystem 104.

The SEC may also include a housing 410 that encloses the battery subsystems 102 and the power subsystem 104. In some embodiments, the housing 410 of the SEC may be hermetically sealed, such that access to the internal SEC systems is only available through interfaces in the housing. A first interface 402 can provide communication for status and/or command information to/from the SEC. A second interface 404 can provide a DC voltage from the SEC to the smart power system 108.

Figure 5:
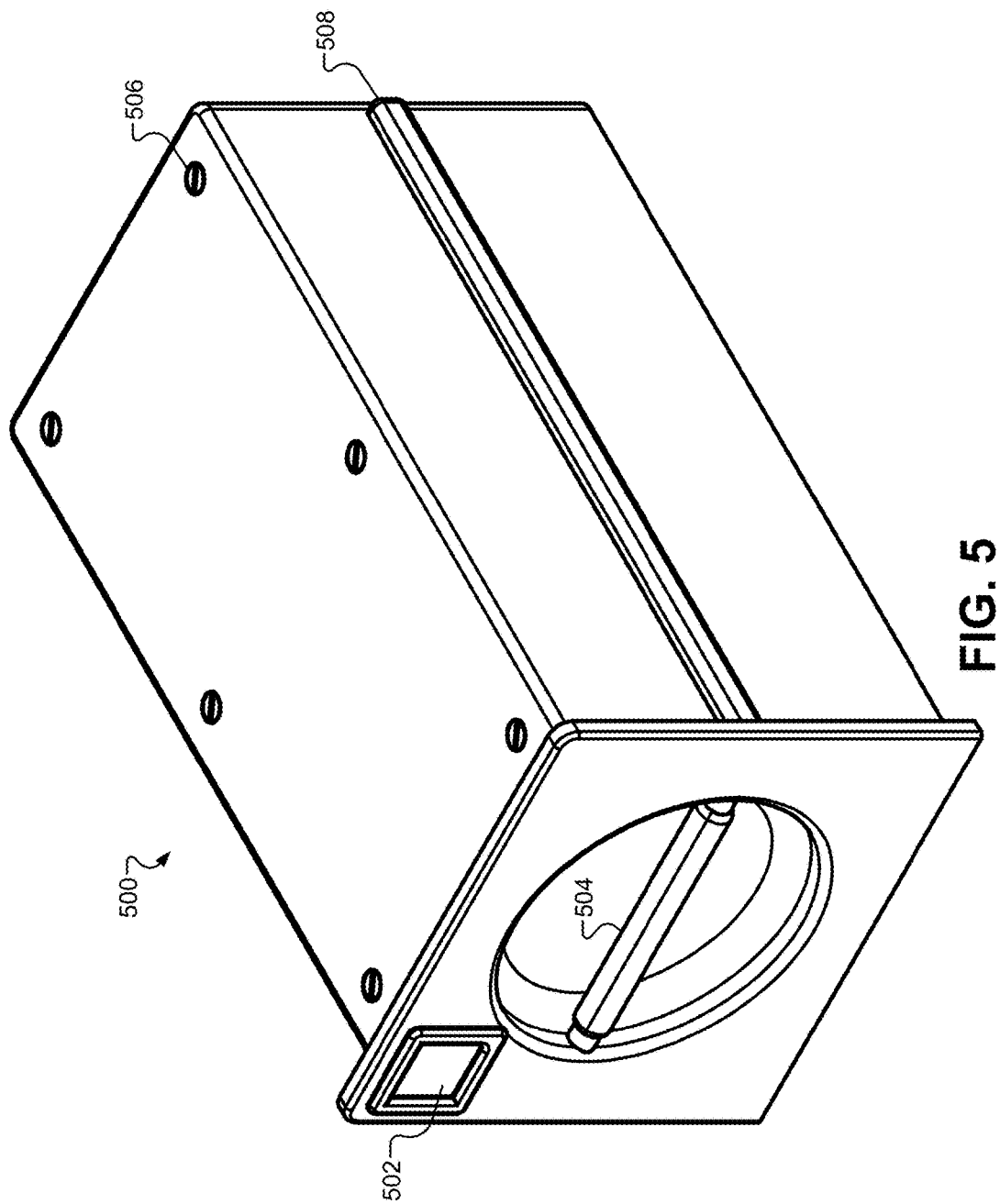
FIG. 5 illustrates a housing of a SEC, according to some embodiments.

FIG. 5 illustrates a housing of a SEC, according to some embodiments. While the physical form and volume of the SEC housing can take any shape or size, some embodiments may be approximately 0.25 cubic feet. These embodiments may be approximately 6"×6"×12". Other embodiments may be approximately 0.125 cubic feet. These embodiments may be approximately 3"×6"×12". SECs may be stackable in a Lego-like fashion on top of each other such that a plurality of SECs can be connected together in a modular fashion and removed/inserted into the rest of the power system. The housing of the SEC may include a mechanically and structurally strong and thermally conductive material such as aluminum. Internally, the SEC may include a chassis to which all of the subsystems (i.e., battery subsystems and the power subsystem) can be mechanically fastened to on both sides. The chassis can be perforated to allow circulation of a thermal material and for wire connections. In some embodiments, the housing can use molded material along the sides that inset between aluminum panels on the top/bottom where thermal transfer may be required.

A handle 504 can be used to insert/remove the SEC from the smart enclosure of the power system. Additionally, the handle 504 can also be used as a locking mechanism to ensure physical contact with the interfaces connecting the SEC with the smart enclosure. By locking the SEC in place, this can guarantee positive engagement between the interfaces and contact with heat transfer mechanisms and electrical terminals. The locking mechanism may be comprised of a screw through the center of the SEC to secure the SEC to the containment unit. Alternatively, the SEC can use locking tabs that extend from the sides of the SEC upon rotation of the handle 504. The handle can be spring-loaded such that the handle disengages the locking mechanism when turned. In another embodiment, the SEC may be secured by closing a lid, cover, or other components over the SECs when they are inserted into the smart enclosure. This locking process may engage a master electrical switch, allowing no power flow unless properly engaged, or to act as a master reset on all control, monitoring, and microprocessor activities.

In some embodiments, the housing of the SEC may include a display 502. The display 502 can be implemented using an LED/LCD active/passive display. The display 502 can be used to communicate status or state of health information of the SEC to a user. Alternatively or additionally, the status or state of health information can be transmitted through NFC or other wireless protocols to a user's smart phone or a similar device. In some embodiments, the status or state of health information can be transmitted to an app, web portal, or electrical control unit of an electric vehicle.

In some embodiments, the SEC may include electrical conductors as part of its frame that can also be used as a means to connect other SEC units together. A pair of guide rails 508 may be used for power transfer with one exposed (typically the negative terminal) and the other recessed. The guide rails 508 can also aid with alignment and stability when inserting/removing the SEC from the smart enclosure.

To allow for easy repair, replacement, recycling, and upgrades for the battery subsystems as battery technologies and chemistries advance, the housing of the SEC may include an accessible cover 506. The cover 506 can be formed from one or more pieces on the outer structure of the SEC and held in place with fasteners, such as screws. The cover 506 can also act as a heat sink between the SEC and the smart enclosure. In embodiments where the SEC is not hermetically sealed, the cover 506 can be vented to allow for airflow.

In some embodiments, the SEC may be hermetically sealed or at least watertight. As described below, when a dangerous condition such as overheating is detected, the housing of the SEC can be flooded with an electrically non-conductive and thermally conductive, and/or fire retardant fluid or material that can absorb heat and prevent any fire hazards. In some embodiments, the SEC can be continuously flooded with these types of materials.

Figure 6:
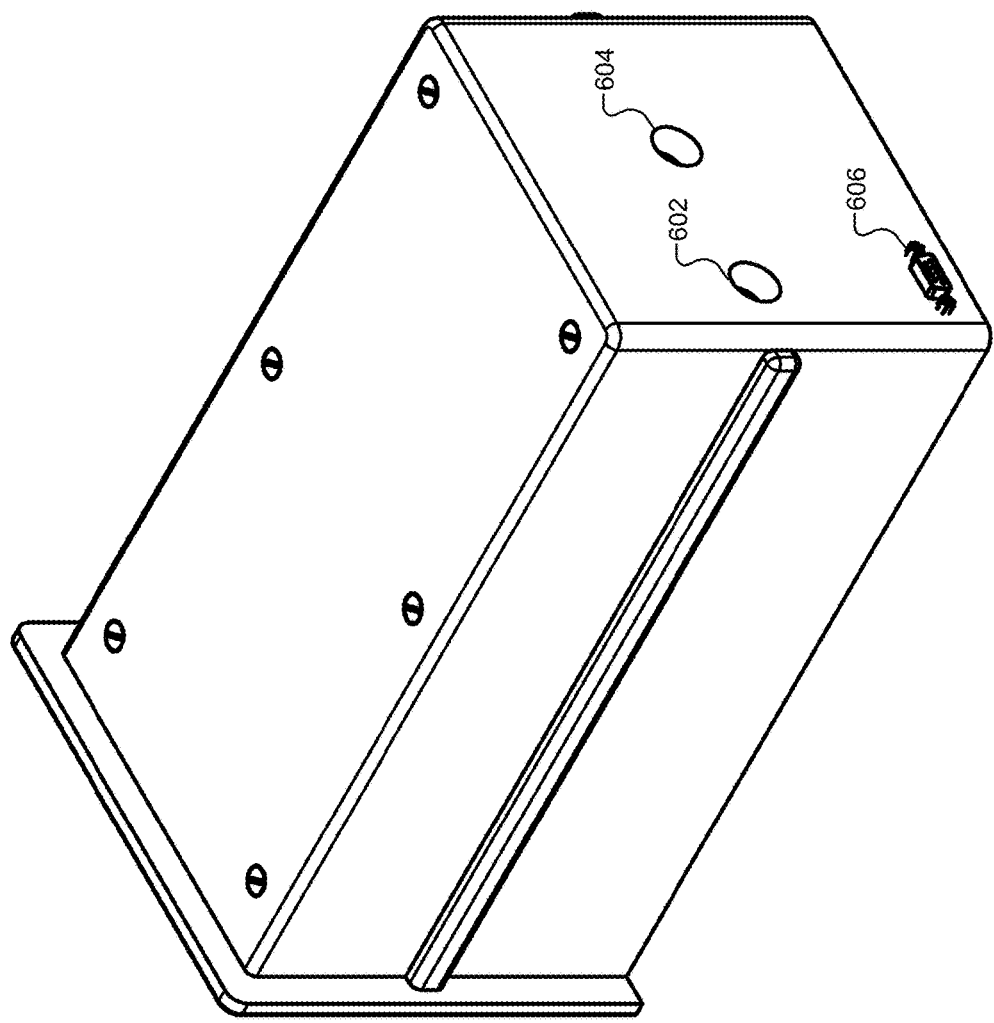
FIG. 6 illustrates a rear view of the housing of a SEC, according to some embodiments.

FIG. 6 illustrates a rear view of the housing of a SEC, according to some embodiments. The housing may include one or more power ports 602, 604 that are recessed into the housing to prevent short-circuits. The power ports 602, 604 are also offset from the center of the housing to ensure correct alignment and polarity upon insertion into the smart enclosure. Alternatively, the guide rails 508 from FIG. 5 may also be used for power transfer as described above.

The housing may also include a communication port 606 that allows for communication between the SEC and the smart power system of the smart enclosure. Some embodiments (not shown) that use liquid cooling systems may also include valves that are recessed into the housing that can accept liquid coolant through corresponding ports in the smart enclosure.

The example of FIG. 6 uses wired communication and power ports. However, as described above, other embodiments may use wireless communication devices (e.g., Bluetooth, Wi-Fi, NFC, etc.) to communicate between the SEC and the smart power module of the smart enclosure. Additionally, other embodiments may use wireless power transfer between the SEC and the smart power system of the smart enclosure. Therefore, the wired communication and power ports of FIG. 6 are not meant to be limiting.

Figure 7:
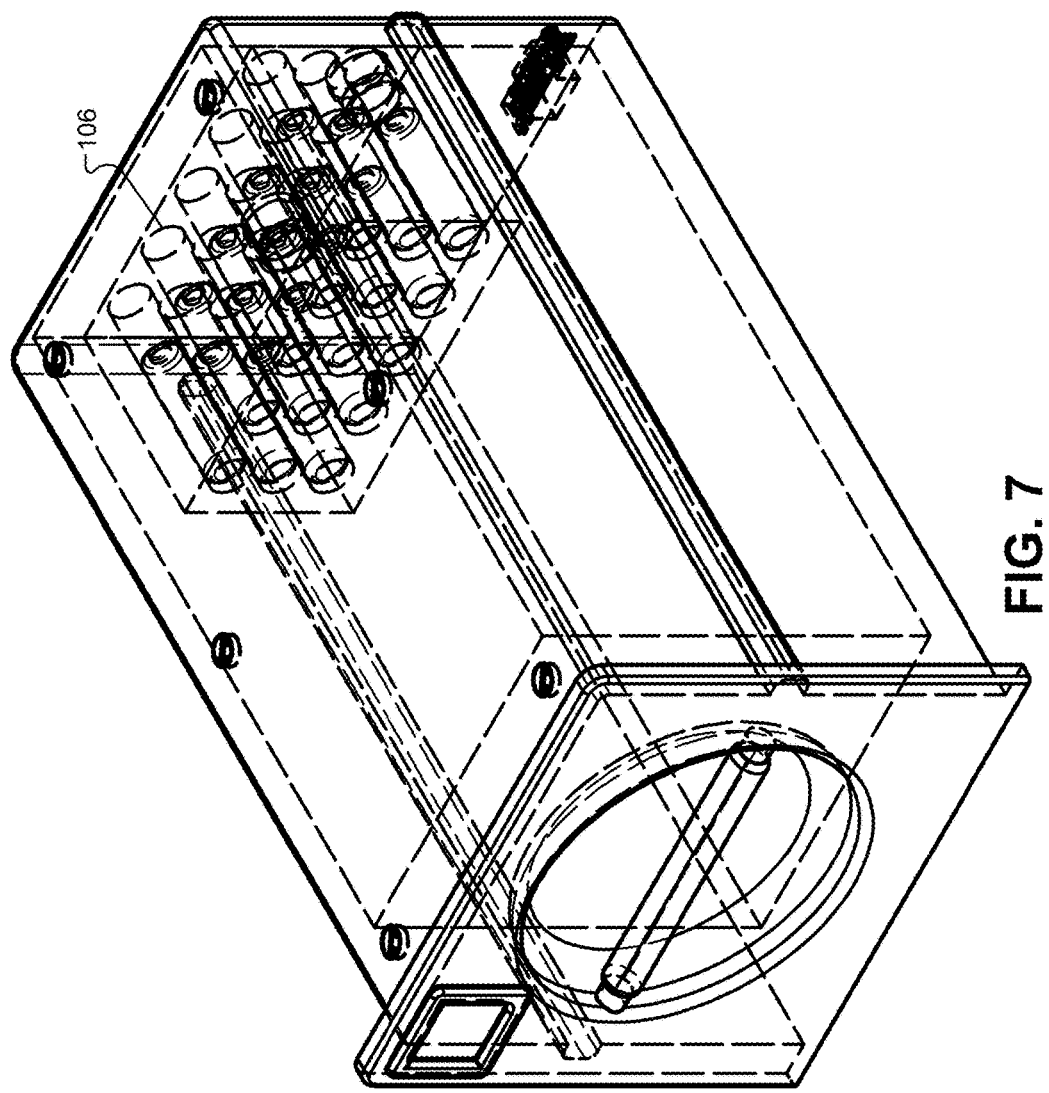
FIG. 7 illustrates a cutaway view of a SEC, according to some embodiments.

FIG. 7 illustrates a cutaway view of a SEC, according to some embodiments. As illustrated, the battery subsystems 106 can be enclosed in respective housings and aligned and/or mounted with in the housing of the SEC. This modularity allows for battery subsystems to gain storage capacity or reduce weight depending on the price/performance criteria for each application as battery storage chemistries evolve. The battery subsystem 106 in FIG. 7 includes 15 individual battery cells. As described above, battery subsystems 106 may include varying numbers of battery cells depending on the application.

Figure 8:
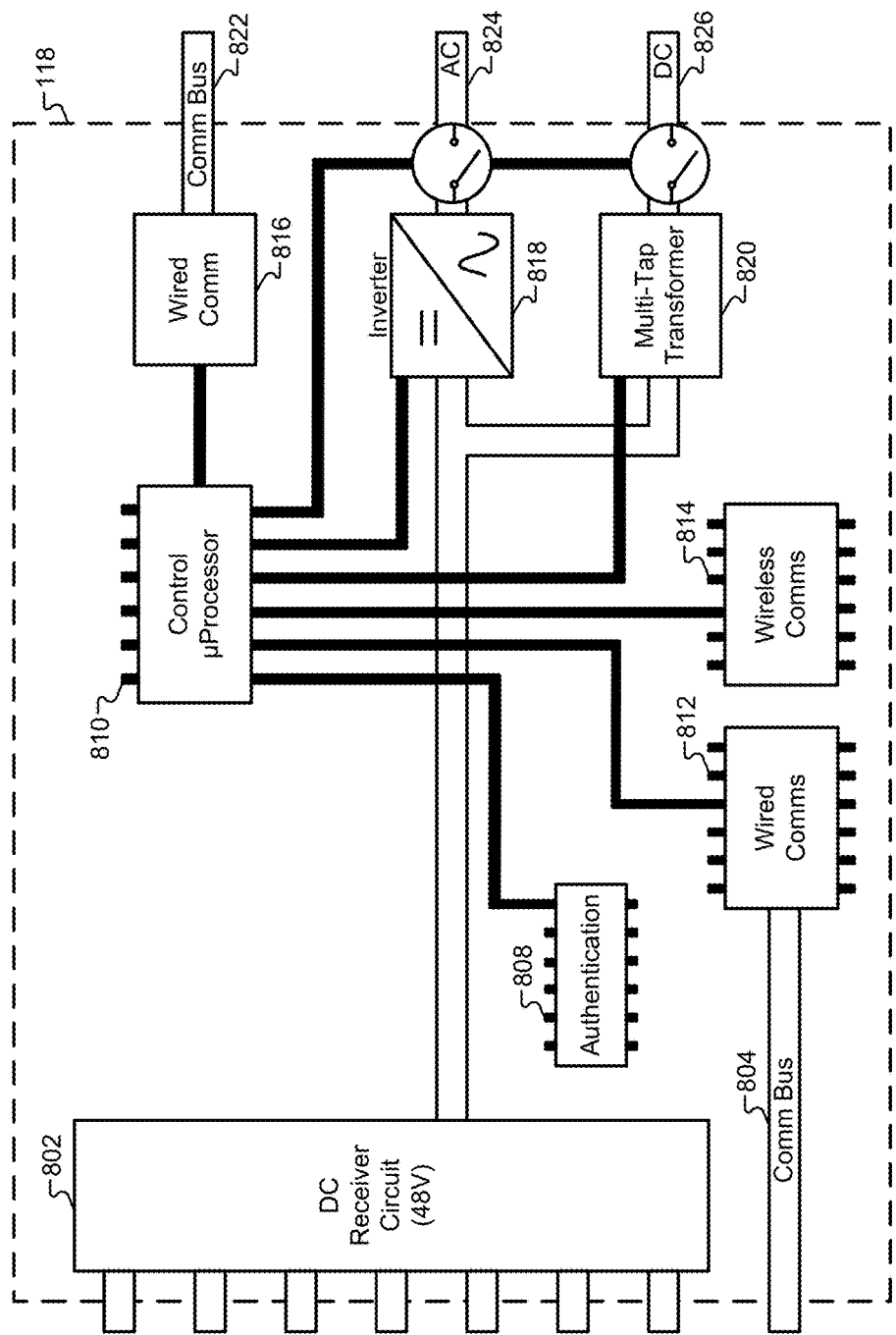
FIG. 8 illustrates a power subsystem of a smart power system, according to some embodiments.

FIG. 8 illustrates a power subsystem 118 of a smart power system 108, according to some embodiments. The power subsystem 118 may be similar to the power subsystem 104 of the SECs. The power subsystem 118 may include a DC receiver circuit 802 that aggregates the DC voltage signals received from each of the SECs. A multi-tap transformer 820 can receive each of the DC signals from the SECs and generate a final DC output 826 based on stored parameters. The DC receiver circuit 802 can receive one input connection per SEC which may be made via an electrical bus connector or a molex-type connector for wiring.

The power subsystem 118 can include a memory that stores configurable parameters such that the power subsystem 118 can be programmed to provide different waveforms. These parameters may form part of an energy profile that can be authenticated, updated in real-time, and stored. In addition to a DC port 826, the power subsystem 118 can include an AC port 824 that is electrically coupled to an AC inverter 818. A processor 810 can retrieve stored parameters and determine what type of AC signal should be generated by the power subsystem 118. For example, the processor 810 can access stored parameters that determine the voltage/current and frequency of an AC output. A load device, such as the electrical system of electric vehicle can communicate the needed electrical characteristics of the output of the power system. When the power subsystem 118 communicates with the load system, it can be dynamically programmed with the proper parameters according to the needs of the load system. For example, the DC output can be configured for between 12 and 48 VDC, between 110-336 VAC, and up to 320 A in some embodiments. In some embodiments, the DC ports 826 and the AC port 824 can be combined into the same physical connection to the smart enclosure, such that the same two-port interface can be used for both output types.

Like the power subsystems of the SECs, the power subsystem 118 may include a communication bus 814 that is communicatively coupled to each of the SECs, a wired communication chip 812, and/or a wireless communication chip 814. An authentication module 808 can be coupled to the processor 810 (or may be an integrated part of the processor 810) and can be used to authenticate communications with the various SECs such that they are enabled to provide power to the power subsystem 118. A wired communication chip 816 and a communication bus 822 can be used to communicate with the load device, such as the electrical system of electric vehicle to receive configuration parameters.

Figure 9:
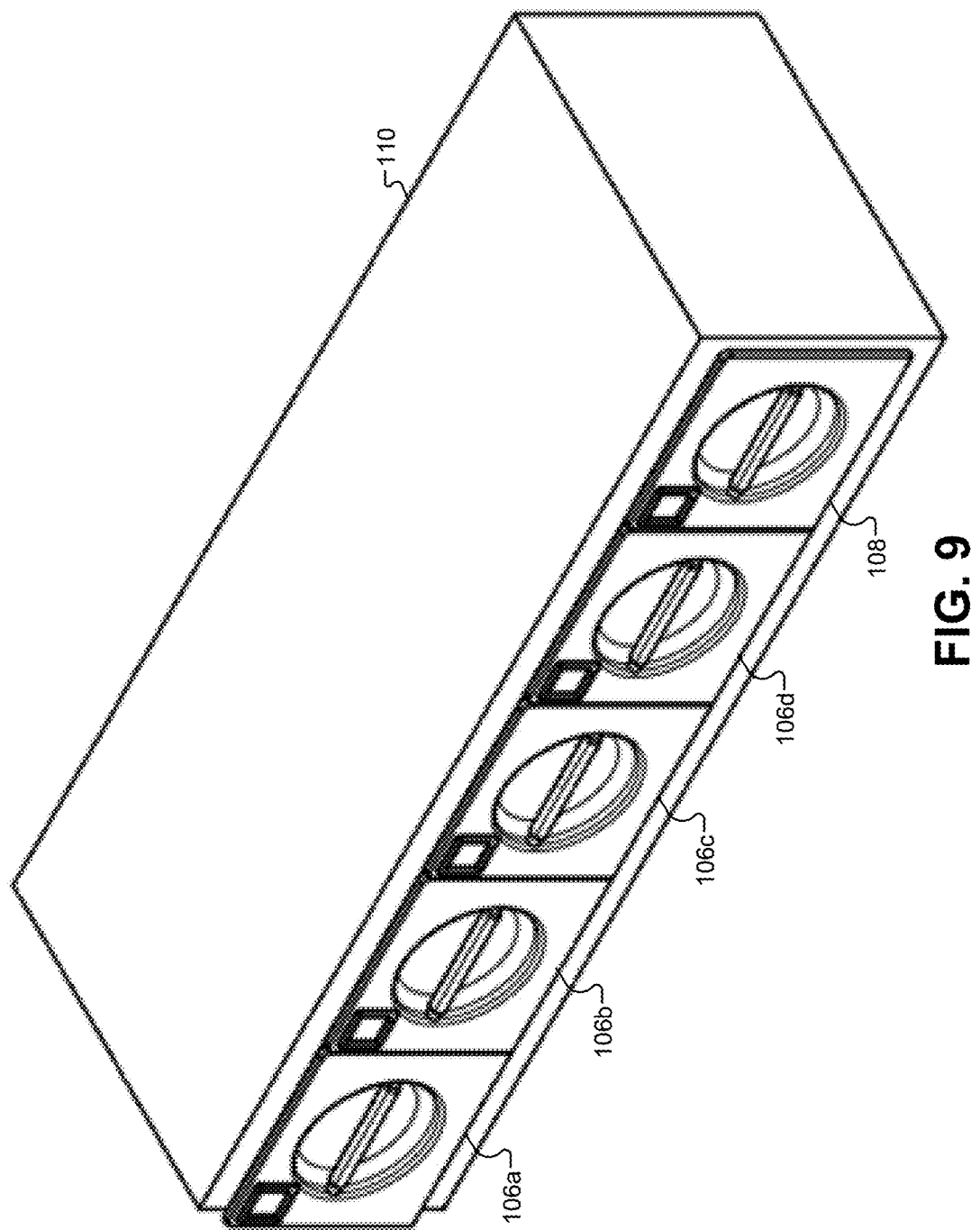
FIG. 9 illustrates the physical arrangement of a smart enclosure with a plurality of SECs and a smart power system, according to some embodiments.

FIG. 9 illustrates the physical arrangement of a smart enclosure 110 with a plurality of SECs 106 and a smart power system 108, according to some embodiments. As illustrated, the smart power system 108 can be constructed to have the same form factor as each of the SECs. Specifically, the smart power system 108 may be constructed from a mechanically strong and thermally conductive material such as aluminum and have an internal chassis that components can be mechanically fastened to on both sides. The housing of the smart power system 108 can incorporate the rotating locking handle to secure the smart power system 108 to the smart enclosure 110. The housing of the smart power system 108 may also be watertight to allow the unit to be flooded with electrically nonconductive and thermally conductive fluid that will absorb heat and act as a fire retardant. As with the SECs described above, the body of the smart enclosure 110 may be used as one or more current carrying conductors to reduce the number of electoral connectors required. For example, the body of the smart enclosure 110 may be used as a negative (−) pole.

When the SECs 106 and the smart power system 108 are inserted into the smart enclosure 110, the smart power system 108 can process the status of each of the SECs that are connected to it to monitor the charge level, temperature, voltage, current, and so forth. In some embodiments, the smart power system 108 can regulate the flow of power to/from the individual SECs 106. For example, if one SEC 106a experiences a voltage sag, the smart power system 108 can take the SEC 106a off-line and compensate using other SECs (106b, 106c, 106d). Additionally, the smart power system 108 can regulate the flow of cooling fluid to each of the SECs 106 based on temperature readings and/or requests received from each of the SECs 106.

The smart enclosure 110 provides the containment unit with the structure to support each of the SECs 106 and the smart power system 108. The smart enclosure 110 also provides electrical and cooling connections as illustrated by FIG. 1. Typically, the smart enclosure 110 can support between three and five (or more) SECs 106 and at least one smart power system 108 to govern power flow through the system. In some embodiments, the smart enclosure 110 can have an overall form factor that fits within a standard 19 inch IT rack. In some embodiments the SECs may be located between the rails and skin of an IT enclosure, or within doors or other body panels of an electric vehicle. The internal backplane of the smart enclosure 110 includes electrical and/or communication bus connections as described above that allow for push-pull connections as the different modules are inserted. This can also enable plug-and-play operation as modules are swapped in and out of the smart enclosure 110.

In some embodiments, the smart enclosure 110 may include a coolant flow system that pumps liquid coolant through each of the SECs 106 and/or the smart power system 108. In some embodiments, the structure of the smart enclosure 110 is hollow to allow cooling to flow and circulate through the smart enclosure 110 to remove heat from the modules. For example, instead of pumping coolant through each of the modules in the smart enclosure 110, the smart enclosure can pump coolant through the structure of the smart enclosure to remove heat from the modules themselves. Although not shown, the structure of the smart enclosure 110 can include two ports on opposite ends of the unit that allow cooling connections to be made with a solenoid for flow control. These cooling connections can be coupled to the cooling system of an electronic vehicle.

In some embodiments, the smart enclosure 110 may include an electro-mechanical actuator that allows the smart enclosure 110 to be raised and lowered in the application environment. For example, the smart enclosure 110 can be embedded into a floor or trunk of an electric vehicle. When swapping any of the modules in the smart enclosure 110, the smart enclosure 110 can be raised or lowered such that the modules can be retrieved from the smart enclosure 110. After swapping, the smart enclosure 110 can be lowered into the floor/trunk of the electric vehicle for convenience.

Figure 10:
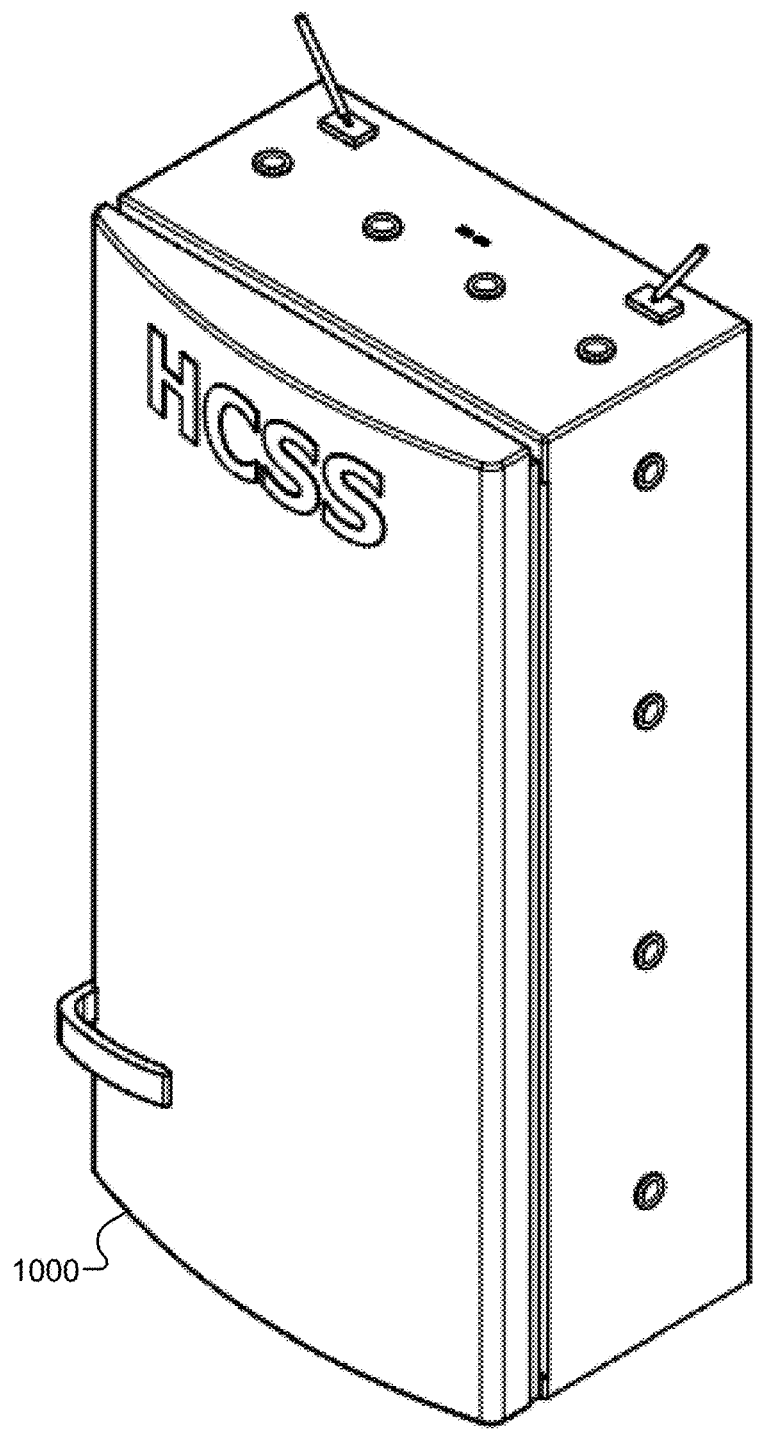
FIG. 10 illustrates a home charging and storage station, according to some embodiments.

FIG. 10 illustrates a home charging and storage station (HCSS), according to some embodiments. The HCSS comprises a system that stores SECs and provides charging, net metering, and other management capabilities. In practice, the HCSS can be used to store and charge individual SECs after they are removed from an electric vehicle. For example, when returning home from a drive, a user can remove SECs from the smart enclosure of the electric vehicle and place them in the HCSS to be recharged. At the same time, the user can remove charged SECs from the HCSS, which can then be inserted into the smart enclosure of the electric vehicle immediately.

The size of the HCSS can vary, but will typically support at least six SECs and one smart power system. The internal surface of the HCSS can mirror the SEC profile and have a similar thermal transfer system as the smart enclosure described above. The HCSS can also include alignment and locking tabs that can mirror those used by the smart enclosure. In short, inserting a SEC into the HCSS can be a very similar experience for a user as inserting and SEC into a smart enclosure in an electric vehicle. The HCSS can support additional cooling systems. For example, the HCSS can include fan-assisted air cooling systems and additional heat sinks that would be too bulky for the smart enclosure.

The HCSS can be connected to a home's electrical power system. During times of low energy usage by the home, the HCSS can charge the SECs stored therein. During times of high energy usage by the home, the HCSS can draw power from charged SECs to provide additional power to the home. Additionally, during demand response (DR) events on the local power grid, the SECs in the HCSS can source additional power to the power grid to take advantage of DR programs offered by a local utility provider. Consequently, the HCSS can incorporate electrical switchgear to prevent backfeeding the grid in the event of a power failure, but can also support net-metering in cases where on-site generation (wind, solar, etc.) is available. From a utility perspective, the HCSS can incorporate meter sockets and intelligence for smart utility meters and other utility-focused features. For example, the HCSS can include a utility meter slot along with provisions to accept conduits another service distribution feeds. The HCSS can function like a basic power source to provide clean power to the consumer and allow the service/utility feed to be disconnected and/or supplemented in the event of a blackout or brownout. The HCSS gateway acts as the communications, monitoring and control hub of the system, which may be deployed as a physical or virtual machine. Aside from local communications and monitoring, the system may also support secure back-channel communications to form an encrypted, mesh network to allow systems, and dependent, authorized users, to communicate status and general data across multiple nodes. This may be supported via wired or wireless technologies, using utility or other communications networks to aggregate data and provide ISP access points. An authorized user, device, or system with the necessary digital certificate and account statue may gain universal access to the network.

Figure 11:
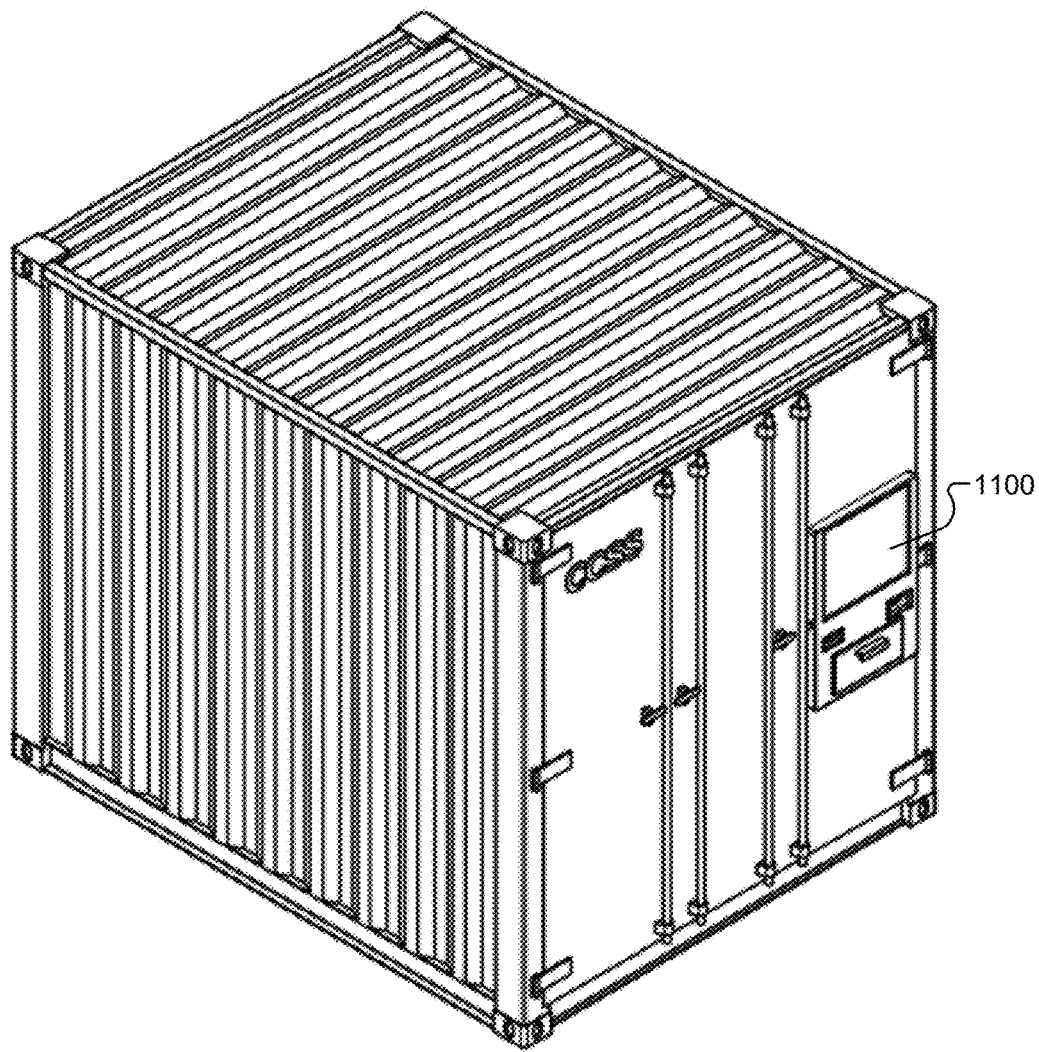
FIG. 11 illustrates a commercial charging and storage station (CCSS), according to some embodiments.

FIG. 11 illustrates a commercial charging and storage station (CCSS), according to some embodiments. As with the HCSS described above, the CCSS comprises a system that stores SECs (and therefore energy), and provides charging, net-metering, and other management capabilities. This may be similar in function to the HCSS, but the CCSS can operate at a larger scale and capacity. For example, the CCSS may typically be of a sufficient size to support up to 500 SECs, and may be the size of a 20 foot shipping container. Inside the CCSS, SECs can be mounted a floor-standing 19" rack that can be up to approximately 7 feet tall. Each rack can include a smart power system that supports and manages all of the SECs in that rack. At the top of each rack, one or more cooling manifolds may be provided (e.g., one for supply, one for return) to connect to each of the cooling fluid ports on the SECs. A heat exchanger can cool the circulated coolant fluid.

In one commercial embodiment, the CCSS can support up to 1 MWh of capacity, 3-phase power, and a 480V AC input/output with a 48V DC feed. As with the HCSS, the CCSS can function like a basic power source to provide clean power to the consumer, and allow the service/utility feed to be disconnected and/or supplemented in the event of a blackout or brownout. Because of its large capacity, the CCSS can be a valuable resource in the utility company's DR strategy. Since the typical CCSS will be on the order of several hundred kWh of capacity and highly distributed, they avoid major utility upgrades and redesign.

In some embodiments, the CCSS can be fully automated like a gas or service station for traditional vehicles. The CCSS can include an automated self-service interface 1100 akin to an ATM at a bank or credit card payment system at a gas pump. The interface 1100 allows a user to exchange discharged SECs for freshly charged SECs through a guided, automated process. The discharged SEC may be placed into a slot/chute, and a freshly charged SEC can be returned in its place. Within the CCSS, a robotic arm can take the discharged SEC and place it in an open slot, allowing it to recharge. The robotic arm can then place a freshly charged SEC back in the user slot. Alternatively, the CCSS may forgo the use of robotics and allow an attendant to manually handle the transaction. Alternatively, the robotics system may extend out from the CCSS, interacting with the vehicle to swap used/charged modules. The robotics may be mounted to the CCSS, or mounted in a separate structure, in ground or otherwise. The robotics system may employ a variety of sensors, controls, and machine learning technology to accurately align and actuate release mechanisms, swap modules, and cycle them from vehicle to/from the CCSS.

Figure 12:
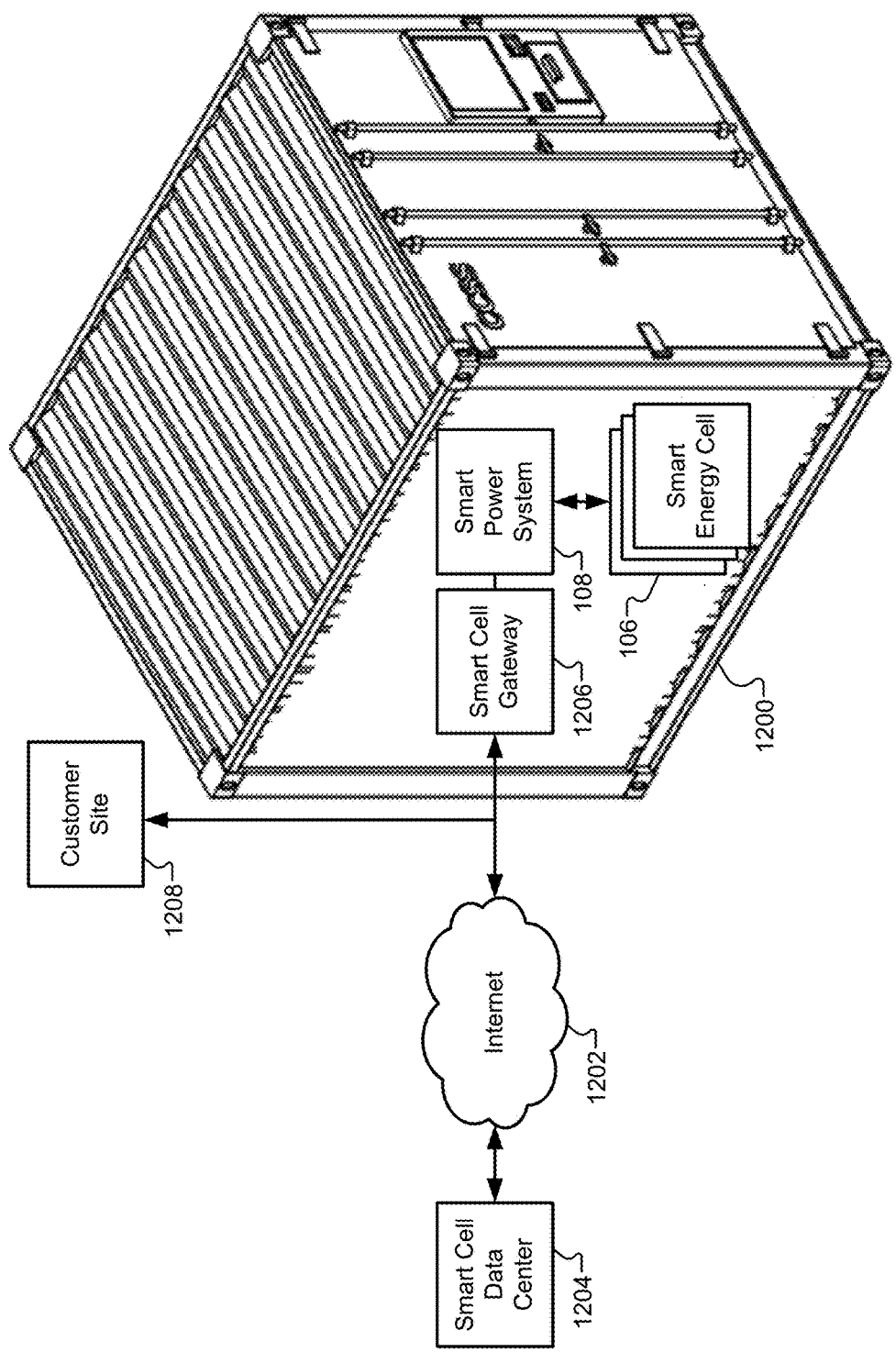
FIG. 12 illustrates a communication architecture for a CCSS, according to some embodiments.

FIG. 12 illustrates a communication architecture for a CCSS 1200, according to some embodiments. As described above, a plurality of SECs 106 can be stored in the CCSS 1200 and governed by at least one smart power system 108. A smart cell gateway 1206 can act as a network interface and data management hub for the on-site infrastructure of the CCSS. The Gateway can receive input from various sensors within the SECs 106, the smart power system 108, and/or the CCSS 1200. The gateway 1206 can also provide local control, continuity, and/or autonomy in the event of a network outage. The gateway 1206 can also be mounted in the standard 19" rack within the enclosure of the CCSS 1200.

The smart power system 108 manages how energy is delivered to/from each of the connected SECs 106. The smart power system 108 can also retrieve status and/or configuration information from each of the SECs 106. The Gateway 1206 can then transmit the status/configuration information to a local customer database 1208. The Gateway 1206 can also transfer this information through the Internet 1202 to a smart cell data center 1204. The data center 1204 can universally store information for each of the SECs registered with the smart cell system. This can also allow other vendors to log into the data center 1204 to locate different SECs and monitor their performance.

Figure 13A:
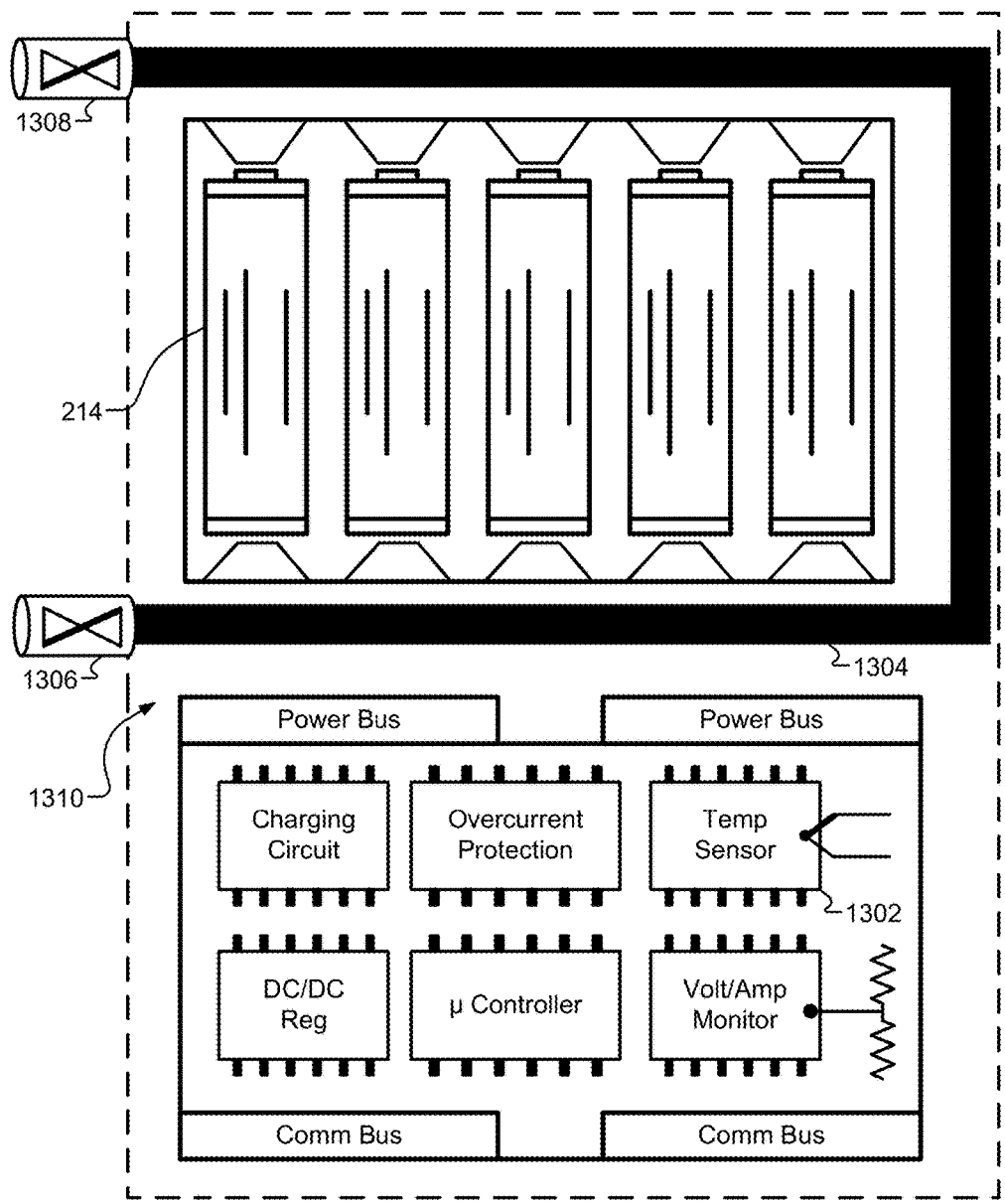
FIG. 13A illustrates a battery subsystem similar to that described in FIG. 2 within an integrated coolant system.

As described briefly above, each of the SECs, battery subsystems, and smart power systems may include integrated cooling systems to remove heat from the battery cells. FIG. 13A illustrates a battery subsystem similar to that described in FIG. 2 with an integrated coolant system. In this embodiment, the battery subsystem may include a thermal material 1310 that is disposed adjacent to the battery cells 214 such that heat can be transferred from the battery cells 214 outside of the battery subsystem. In some embodiments, the thermal material may include a solid material that is thermally conductive and injected into the battery subsystem to substantially fill gaps and spaces between the battery cells 214 and the housing of the battery subsystem. This thermal material can then transfer heat from the battery cells 214 through the thermally conductive housing of the battery subsystem. The thermal material may also include gels or thermal greases that can fill empty space within the battery subsystem. The thermal material may also include a vapor compression that evaporates a liquid that is then condensed away from the battery cells.

The thermal material may also include tubing 1304 that allows liquid coolant to flow through the battery subsystem. In some embodiments, the tubing 1304 can be wrapped around individual battery cells 214 or groups of battery cells 214 to absorb a maximal amount of heat. The tubing 1304 can be coupled to a pair of connectors 1306, 1308 that can be attached to an external coolant flow system.

Figure 13B:
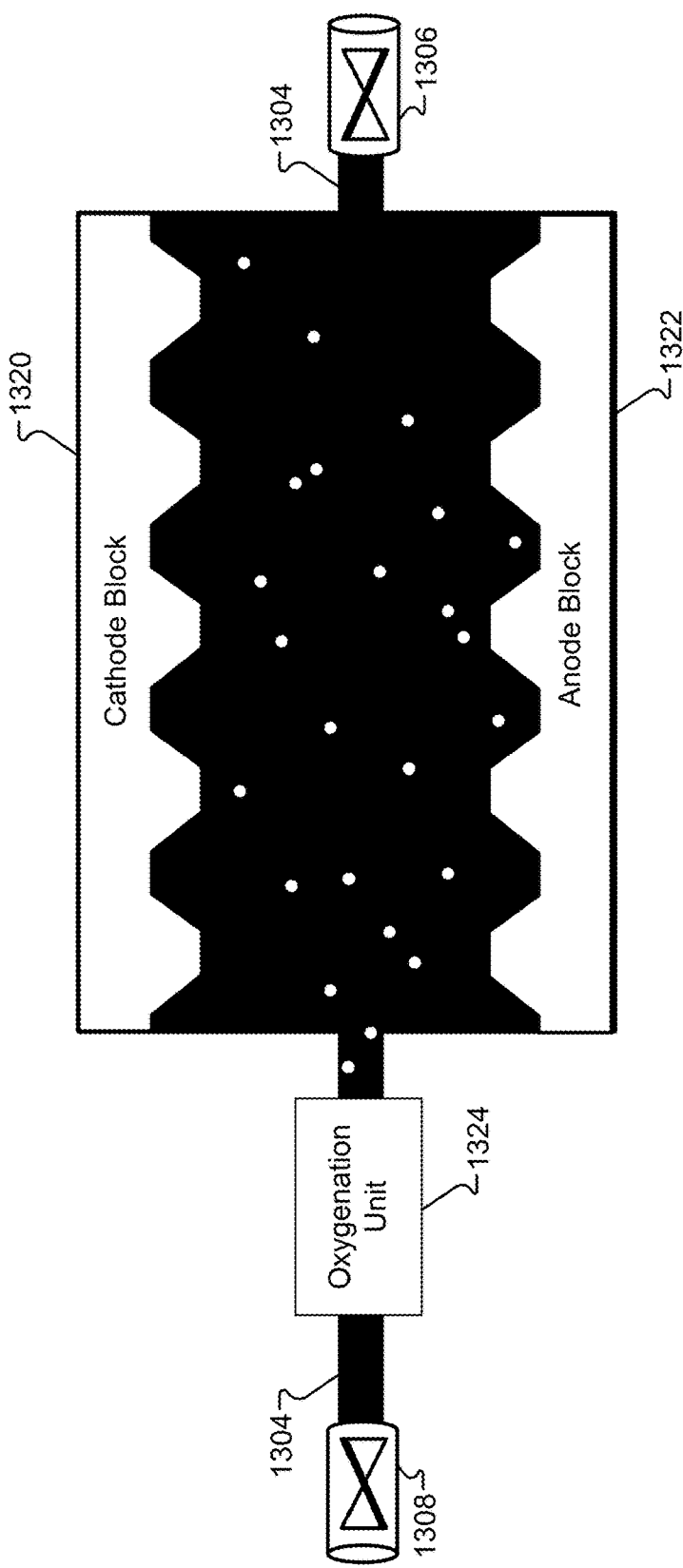
FIG. 13B illustrates a battery subsystem using a flowable electrolyte, according to some embodiments.

FIG. 13B illustrates a battery subsystem using a flowable electrolyte, according to some embodiments. As part of an active cooling solution, the individual battery cells can be replaced by a cathode block 1320 and an anode block 1322. Instead of circulating the liquid coolant around individual battery cells, the liquid coolant can be flowed around the cathode block 1320 and the anode block 1322. By replacing the individual battery cells, the entire battery subsystem 102 can act as a battery module, enabling technologies such as lithium-air battery technologies or metal-air battery technologies. The fluid being circulated through the pair of connectors 1306, 1308 can serve a dual function as both a liquid coolant and an electrolyte for the battery subsystem 102. For example, while the exact fluid base may be determined for each battery chemistry based on a variety of parameters, it may be a super-oxygenated water for conductive criteria, or fluids such as 3M Novec® for non-conductive criteria.

The flow rate of the coolant/electrolyte can be dynamically monitored and adjusted by the power subsystem 104 of the SEC 106 and/or the power subsystem 118 of the smart power system 108. As described above, the power subsystem 104 of each SEC 106 can interrogate/authenticate each battery subsystem 102 to identify the type of energy cell technology. Energy cells can store serial numbers that can be used by the power subsystem 104/118 to look up operating characteristics, or energy cells can provide operating characteristics (e.g., voltage, current, cycle time, etc.) directly to the power subsystem through a resource profile 104/118. Different technologies may require different types of electrolytes at different flow rates to effectively cool the battery subsystems 102 and provide the right electrochemistry. After identifying the battery technology, the power subsystem 104 can communicate with the power subsystem 118 of the smart power system 108 to flow the right type of electrolyte at the proper flow rate.

For example, oxygen is one of the required elements of the chemical reaction in a lithium-air battery technology. The cooling system can be leveraged as a medium by which an electrolyte and oxygen can both be provided to the battery cells. By oxygenating the liquid that is flowed between the anode block 1322 and the cathode block 1320, enough oxygen can be present between the anode block 1322 and the cathode block 1320 for the lithium-air reaction. To oxygenate the liquid, air bubbles can be injected into the liquid, much like how the water in a fish tank is oxygenated using an oxygenation unit 1324. In other embodiments, the oxygenation unit 1324 may be replaced by other units that introduce additional elements into the electrolyte fluid flow (e.g., sodium hydroxide).

Figure 14:
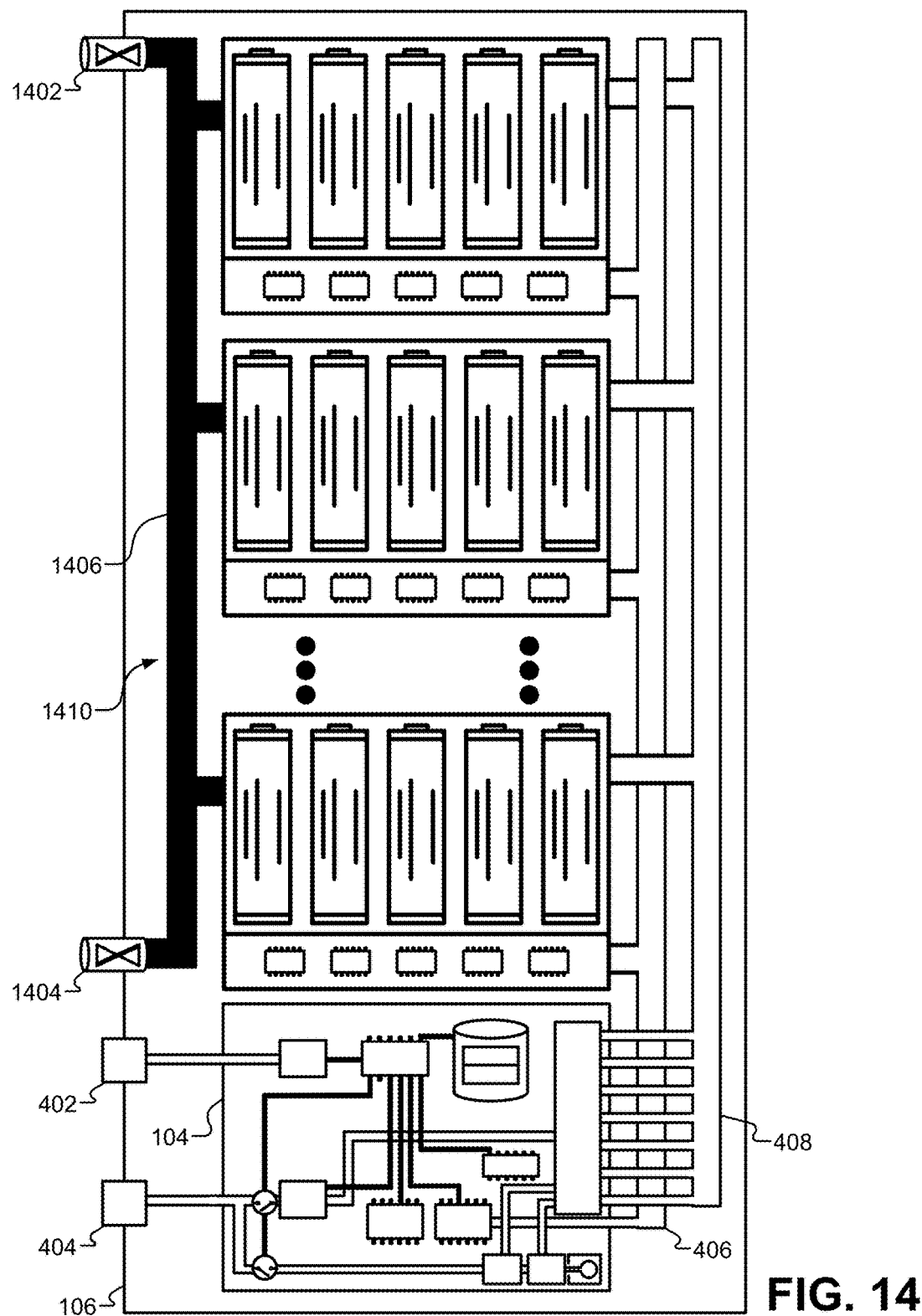
FIG. 14 illustrates a SEC comprising an integrated thermal material, according to some embodiments.

FIG. 14 illustrates a SEC 106 comprising an integrated thermal material, according to some embodiments. Like the battery subsystem described above, the SEC 106 can also include a thermal material 1410 that is injected into the housing of the SEC to substantially fill any gaps between the battery subsystems 102, the power subsystem 104, and the housing of the SEC. The thermal material may include a solid thermally conductive material. The thermal material may also include gels or thermal grease is that couple the internal components of the SEC 106 with the housing of the SEC.

Similar to the battery subsystem, the thermal material 1410 of the SEC 106 may also include tubing 1406 and/or liquid coolant that is circulated through the SEC 106. A pair of connectors 1404, 1402 can be connected to the tubing 1406 and configured to receive liquid coolant that is pumped and provided by the smart enclosure. For example, connector 1402 may comprise an input port, and connector 1404 may comprise an output port. In some embodiments, the tubing 1406 can be wrapped around each of the individual battery subsystems 102 to extract heat from the battery subsystems 102. In some embodiments, the tubing can connect to connectors, such as connectors 1306, 1308 in FIG. 13A on each of the battery subsystems 102. Thus, coolant can flow from the smart enclosure to the tubing 1406 of the SEC 106, then into the tubing 1304 of each of the battery subsystems. Connectors 1402 and 1404 may comprise push-pull connectors that can couple automatically as the SEC 106 is inserted into the smart enclosure.

Figure 15A:
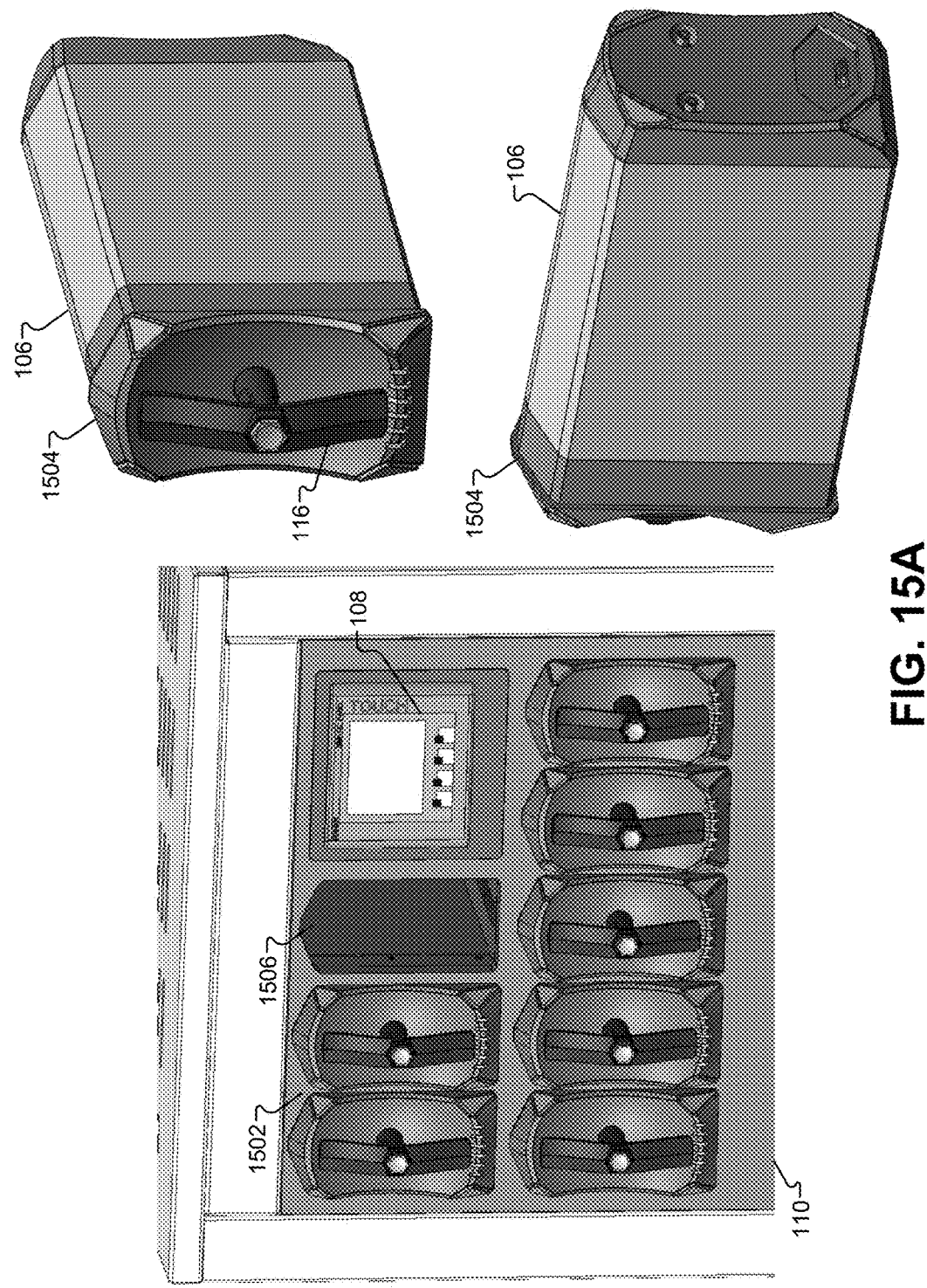
FIG. 15A illustrates a diagram of a smart enclosure and an SEC, according to some embodiments.

FIG. 15A illustrates a diagram of a smart enclosure 110 and an SEC 106, according to some embodiments. This particular smart enclosure 110 includes a plurality of bay openings 1506 into which the SECs 106 can be inserted. The smart enclosure 110 includes a front face 1502 that completely encloses a front portion of the smart enclosure 110. The front face 1502 can be formed from a single piece of material such that the only openings in the front face 1502 are the bay openings 1506 designed for the insertion of the SECs 106 and the insertion of the smart power system 108. In some embodiments, the form factor of the smart power system 108 may be substantially the same as a form factor of the SECs 106. In other embodiments, the form factor of the smart power system 108 may be approximately sized such that it occupies two or more slots where SECs 106 could be inserted.

When the SECs 106 are inserted into the bay openings 1506 in the front face 1502 of the smart enclosure 110, a liquid-tight seal can be formed between the front face 1502 and the SECs 106. For example, the front of each SEC 106 can include a bezel 1504 that stops the inward motion of the SEC 106 as it is inserted into the bay opening 1506 in the front face 1502. The bezel 1504 may protrude radially from the casing of the SEC 106 such that the bezel 1504 is wider than the corresponding bay opening 1506 in the front face 1502. The side of the bezel 1504 that comes in contact with the front face 1502 may include a seal or O-ring such that when the bezel 1504 is pressed against the front face 1502, the bay opening 1506 is completely sealed against gas and/or fluid leakage. The handle 116 of the SEC 106 can provide a user control that actuates to lock the SEC 106 in place such that the bezel 1504 presses against the front face 1502 and the gas-/liquid-tight seal between the SEC 106 and the front face 1502 is maintained while the handle 116 remains in a locked position in the bay opening 1506.

FIG. 15A illustrates a diagram of a smart enclosure 110 and an SEC 106, according to some embodiments. In some embodiments, the interior of the bay opening 1506 may comprise a walled cavity that conforms to the exterior contours of the corresponding SEC 106. In the example of FIG. 15, the interior of the bay opening 1506 may include flat bottom and side walls with an angled ceiling to conform to the shape of the SEC 106. Other shapes, contours, and mechanisms may be used to provide a keyed, and self-aligning module to simplify and aid insertion. The walled cavity inside the bay opening 1506 may be completely sealed internally such that fluid circulating inside of the smart enclosure 110 will be kept out of the walled cavity. When each of the wall cavities within the bay openings 1506 are sealed, the remaining interior of the smart enclosure 110 can be flooded with cooling fluid. The cooling fluid can be actively circulated through the interior of the smart enclosure such that it flows freely around each of the walled cavities holding the SECs 106. In some embodiments, instead of flooding the remaining interior of the smart enclosure 110 with cooling fluid, the cooling fluid can be pumped through channels, tubes, or other routing mechanisms that are wrapped around each of the walled cavities in the bay openings 1506. This may ensure that the cooling fluid is actively circulated around each of the walled cavities so as to extract heat that is transferred from the inserted SECs 106.

While the bay openings 1506 include a walled cavity that are sealed relative to the rest of the interior of the smart enclosure 110, some embodiments may include mechanisms that maintain thermal contact between the exterior of the SEC 106 and the interior of the walled cavity. These bay dividers may be removable to support a full-width modules such as fuel cells. As energy cells heat up during use, some battery chemistries or fuel-cell embodiments will thermally expand during operation. As this expansion occurs, the SEC 106 may expand radially, longitudinally, and/or laterally depending on the orientation and electrochemistry involved. Ideally, the smart enclosure 110 is agnostic towards the particular type of energy cell inside it each SEC 106. Therefore, the interior of the walled cavity may include floating heat transfer panels that automatically align with the walls of the cavity in the bay opening 1506. The heat transfer panels may include compressible and/or inflatable material that bleeds air and removes free space out of the walled cavity. For example, the heat transfer panel may be aligned with the top and/or bottom face of the SEC 106 to (1) maintain thermal contact between the exterior of the SEC 106 and the interior of the walled cavity, and (2) expand to remove any air or empty space in which condensation might build up. In some embodiments, the heat transfer panel does not need to stop expansion in any direction, but rather simply needs to absorb the expansion and maintain contact between surfaces. Some embodiments may use materials that have thermal properties that expand in an amount similar to a known expansion of the SEC 106 during operation. Other embodiments may be designed so as to accommodate any SEC 106 expanding in any direction. For example, some heat transfer panels may be comprised of an elastic, compressible, or compliant material that is allowed to expand and/or contract as the SEC 106 thermally expands and/or contracts. Some heat transfer panels may replace one or more of the walls in the walled cavity of the bay opening 1506.

In addition to using the heat transfer panels, some embodiments may use a thermal interface paste or similar material to increase thermal bridging between the surfaces of the SEC 106 and the walled cavity of the bay opening 1506. In some embodiments, carbon nanotubes and/or graphene can be used as a thermal interface to increase operating temperature ranges. Carbon nanotubes are extremely efficient at transferring heat to increase the contact surface area between two surfaces. They can also be used to adhere a surface to a heat source. Some embodiments use a graphene foam module to provide a thermal bridge between the interior of the walled cavity and the exterior of the SEC 106. Carbon nanotubes may be particularly beneficial in cases where passive heat conduction is difficult and the power density of the SECs 106 are high (e.g., 13 battery cells may correspond to a 24 W array in a single SEC 106) with a limited area through which to conduct excess heat. As described above, the power subsystem 118 of the smart power system 108 can authenticate and/or interrogate each SEC 106 to determine the thermal characteristics and thermal transfer needs of each particular SEC 106. The graphene foam inserts can be designed to accommodate the "worst-case scenario" for the thermal needs of possible battery chemistries and/or fuel cells. In some embodiments, the carbon nanotubes that form the thermal interface can also provide a gripping property that secures the SEC 106 into the bay opening 1506 (similar to that way that traditional hook-and-loop fasteners prevent lateral movement). It should be noted that the heat transfer problems addressed by the embodiments described herein are unique to the present system that is agnostic towards the particular battery technology and provides such high power densities.

Some embodiments may maintain a static fluid and/or solid thermal material inside of the SEC 106. The enclosure of the SEC 106 may form a sealed module against any external gas or liquid. As described above, the SEC 106 may include inlet/outlet ports for circulating an electrolyte and/or cooling fluid through the SEC 106. The SEC 106 may also include one or more electrical interfaces that allow for communication, authentication/interrogation, and power transfer between the SEC 106 and the smart power system 108. Heat can be passively transferred away from the energy source inside of the SEC 106 via the internal thermal material/fluid through the walls of the SEC 106. In some embodiments, the sealed case of the SEC 106 can replace at least a portion of the walled cavity inside the bay opening 1506. Instead, the smart enclosure 110 can simply provide an interface at the rear of the smart enclosure 110 for the corresponding electrical interface on the SEC 106. Some embodiments may also include slots or guides that guide the SEC 106 into the electrical interface as it is inserted. Then, the interior of the smart enclosure 110 can be flooded to bathe the inserted SECs 106 in cooling fluid. The seal between the bezel 1504 and the front face 1502 of the smart enclosure 110 keeps the cooling fluid from leaking out of the smart enclosure 110 during operation.

The locking system actuated by the handle 116 can be configured to communicate with pressure and/or fluid sensors that maintain the handle 116 in a locked position while the smart enclosure 110 is flooded with cooling fluid. The mechanical system of the load device and/or the smart enclosure 110 may include a fluid pump, a reservoir, and/or a heat exchanger. Before removing one of the SECs 106, the fluid pump can drain the smart enclosure 110 of cooling fluid. An interlock process between the inlet and outlet ports of the smart enclosure 110 can ensure that the smart enclosure 110 is completely drained of cooling fluid before the user is allowed to remove one of the SECs 106. Some embodiments may also include a thin liner or membrane into which the SECs 106 are inserted to keep them having direct contact with the cooling fluid as the smart enclosure 110 is flooded. Other embodiments may allow the cooling fluid to have direct contact with the housing of the SEC 106. Putting the cooling fluid in direct contact with the surface of the SEC 106 bridges the thermal gap between the interior of the SEC 106 and the cooling fluid. In some embodiments, the cooling fluid may be selected such that it evaporates quickly after the smart enclosure 110 is evacuated (e.g., 3M™ Novec™). This interlock process may also apply to safe shut-down procedures for electronic components.

In embodiments where the smart enclosure 110 is flooded with cooling fluid, each bay opening 1506 may need to be sealed before the smart enclosure 110 can be flooded. Some embodiments may require that an actual SEC 160 inserted into each of the bay openings 1506. Other embodiments may provide blanking plates that can be attached to the front face 1502 to cover any of the bay openings 1506 that do not have corresponding SECs 106 inserted. In some embodiments, the blanking plate can be comprised of the same front portion of an SEC 106 with the bezel 1504, handle 116, and seal or O ring. The blanking plate can be installed by placing the blanking plate over the bay opening 1506 and actuating the handle 116 to engage locking mechanism. The blanking plate can prevent air from entering the smart enclosure 110 where condensation may build up as the cooling fluid flows internally. Other embodiments may use blanking plates that use alternative latching techniques that are different from the SECs 106. Some embodiments may also use a complete housing of an SEC 106 used as a dummy cartridge to fill the space in the smart enclosure 110. In this case, the housing of the SEC 106 can have the internal energy cells and/or electronics removed.

Figure 15B:
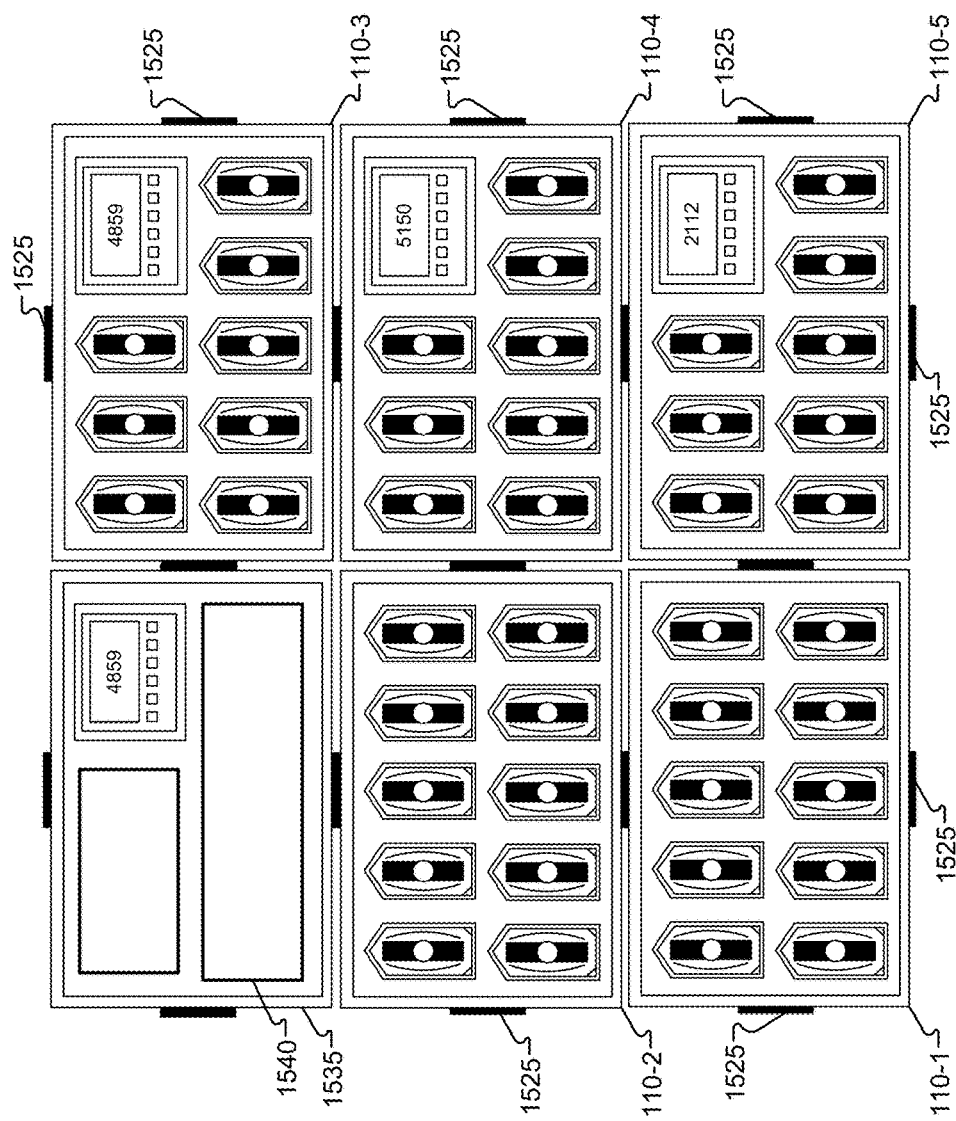
FIG. 15B illustrates an example of how a plurality of smart enclosures can be stacked horizontally/vertically, according to some embodiments.

The mounting configuration for the SEC's 106 illustrated in FIG. 15A is just one example of how the SEC's 106 can be arranged in the smart enclosure 110. Furthermore, the smart enclosure 110 can be stacked with other smart enclosures in the same modular fashion as the SEC's 106 are stacked within the smart enclosure 110. FIG. 15B illustrates an example of how a plurality of smart enclosures 110 can be stacked horizontally/vertically, according to some embodiments. The smart enclosure 110 may include modular electrical and/or coolant interfaces 1525 that will automatically connect when stacked in vertical/horizontal configurations. Some embodiments may include electrical/cooling connectors 1525 on the top of the smart enclosure 110 that mate with corresponding connectors on the bottom side of other smart enclosures 110. Thus, a plurality of smart enclosures 110 can be stacked on top of each other in a vertical configuration and automatically provide electrical/cooling connections between the smart enclosures 110. In some embodiments, the smart enclosures 110 may alternatively or additionally include similar connectors 1525 on each of the sides such that the smart enclosures 110 can be arranged in a horizontal fashion and/or a vertical fashion. In the embodiment illustrated in FIG. 15B, the smart enclosures 110 are shown to be stacked horizontally and vertically such that the horizontal and vertical connectors 1525 are aligned to form a grid of smart enclosures 110. Thus, the grid of smart enclosures 110 can provide one or more electrical/communication inputs/outputs, as well as one or more valves for coolant, electrolytes, waste, fuel, etc.

When multiple smart enclosures 110 are coupled horizontally and/or vertically, they can aggregate and share electrical signals and/or coolant. In some embodiments, a separate power module 1535 may be provided that handles the aggregated electrical power generated from multiple smart enclosures 110. This may be particularly advantageous because efficient power inverters typically require a large physical volume, and may fill most of the available space for the smart power system 108 for a single smart enclosure (e.g., 2.5 kW). However, by instead chaining together multiple smart enclosures 110 and aggregating electrical power into a single smart power module 1535, larger and more efficient power inverters 1540 may be used. Additionally, the single smart power module 1535 can authenticate/interrogate each of the individual smart power systems 108 of the chained smart enclosures 110 to configure how the connections are aggregated from each smart enclosure. For example, the single smart power module 1535 for the group of smart enclosures 110 can configure each smart enclosure 110 to provide combinations of serial connections and/or parallel connections between the smart enclosures 110 to increase the voltage and/or current provided by the system as a whole. Note that each of the smart enclosures 110 does not need to include a power module. When the smart enclosures 110 are chained together, power modules can be removed from the smart enclosures, and the space can instead be used for additional SECs 106. In some embodiments, the smart enclosures 110 may be restricted to a horizontal connection rather than the vertical and horizontal connection illustrated in FIG. 15B. Thus, each row of smart enclosures 110 can aggregate power from the SECs 106 horizontally such that only a single power module is needed for the row.

Figure 16:
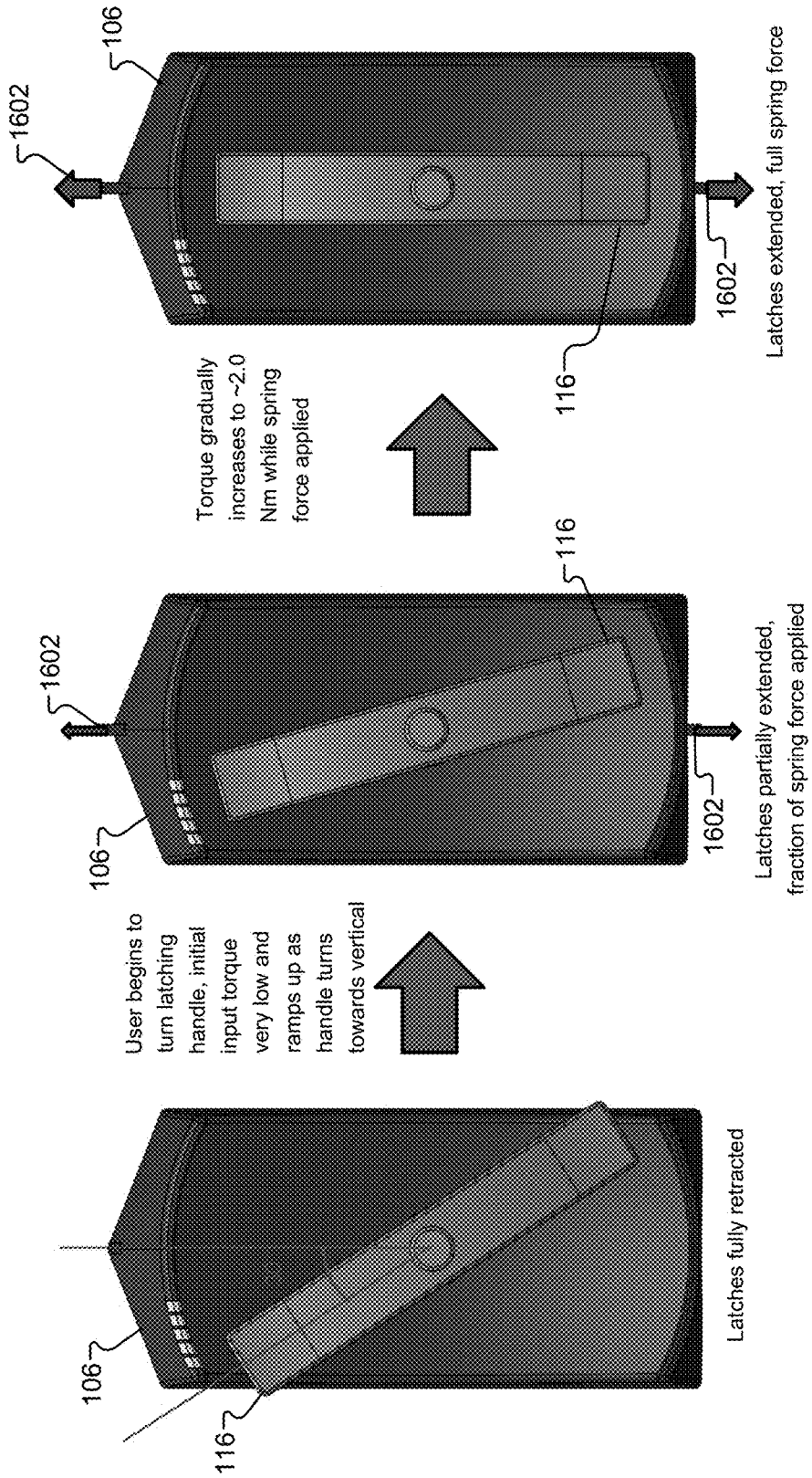
FIG. 16 illustrates one example of a locking mechanism for an SEC and/or a blanking plate, according to some embodiments.

FIG. 16 illustrates one example of a locking mechanism for an SEC 106 and/or a blanking plate, according to some embodiments. This example uses a handle 116 as shown in FIG. 15A. In an unlocked position, the handle 116 can be rotated 30° on a center axis in a counterclockwise direction. Other embodiments may also allow the handle 116 to be rotated in a clockwise direction. As the user begins to turn the latching handle 116, an initial input torque can be applied by a spring mechanism against the rotation of the handle. This initial input torque can be gradually increased as the handle is rotated in a clockwise direction. Latches 1602 on the top and/or bottom of the SEC 106 can begin to extend outward in a radial direction away from the housing of the SEC 106 such that they engage with corresponding indentations in the smart enclosure 110. As the handle 116 reaches a 90° rotation, a center button on the handle 116 can spring outwards and the handle 116 can lock in place. At this point, the latches 1602 are fully extended and the torque applied to handle 116 in a direction opposite of its rotation will be at a maximum. To release the handle, the smart enclosure 110 can be drained of cooling fluid, the center button can be depressed, and the handle 116 can be rotated away from the center 90° locked position.

Figure 17:
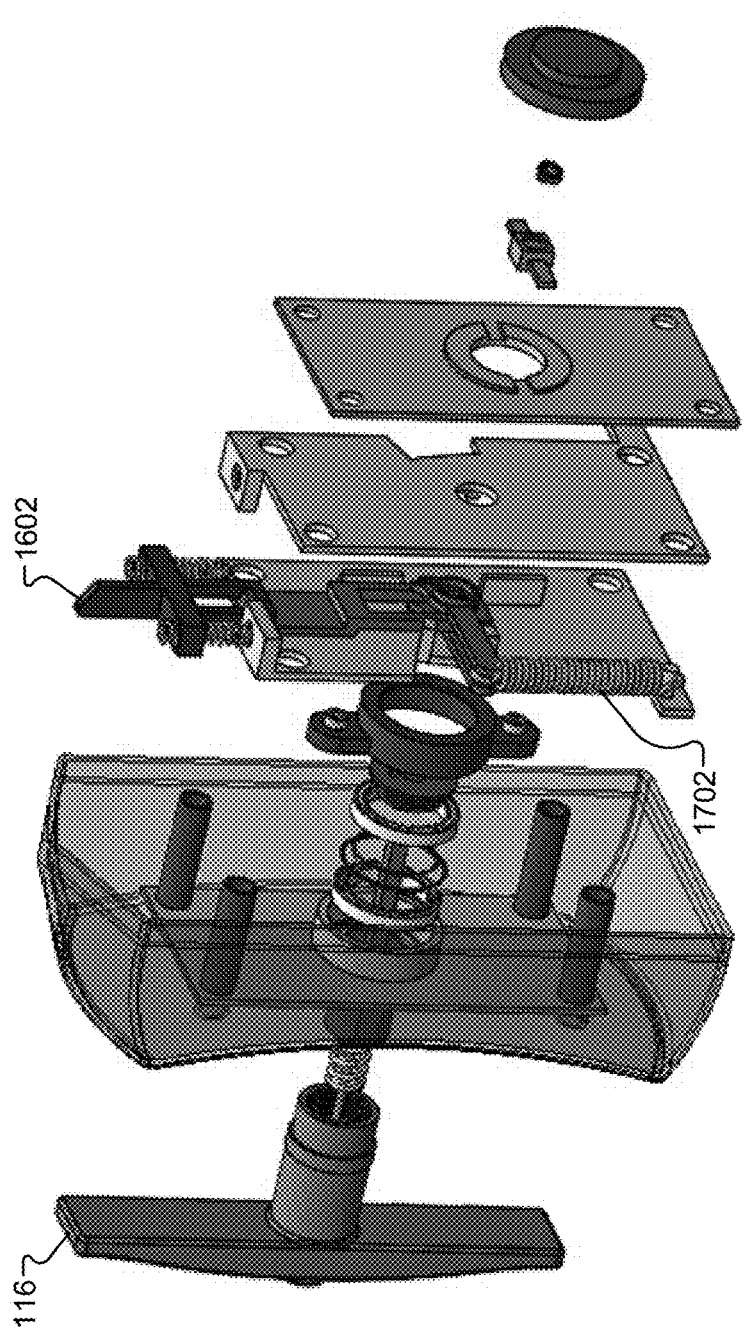
FIG. 17 illustrates an exploded rear view of the locking mechanism of FIG. 16, according to some embodiments.

FIG. 17 illustrates an exploded rear view of the locking mechanism of FIG. 16. This exploded view illustrates how rotating the handle 116 can radially extend the latches 1602. Additionally, a spring element 1702 can be attached to the rotation mechanism on one end and to a non-moving portion of the mechanism at the other end. As the handle 116 rotates away from the 90° locked position in a counterclockwise direction, the spring will gradually extend and progressively apply more rotational force to oppose the rotation. As described above, the exploded view in FIG. 17 can be mounted to the front of an SEC 106. This mechanism can also be assembled in the absence of an SEC 106 and used as a blanking plate to be installed over vacant bay openings 1506 in the front face 1502 of the smart enclosure 110.

Figure 18:
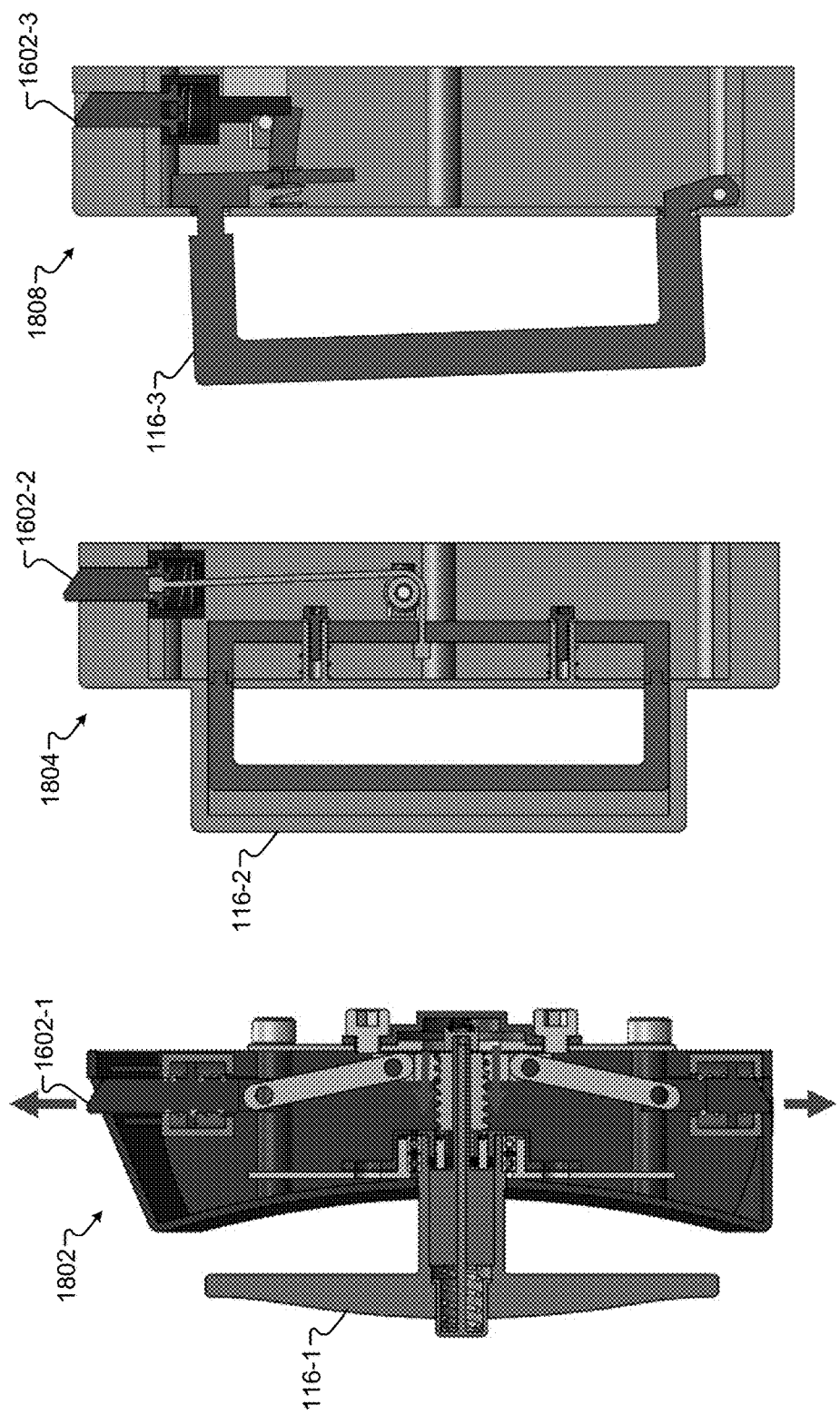
FIG. 18 illustrates additional examples of locking mechanisms that may be used interchangeably as blanking plates and/or locking mechanisms for an SEC.

It should be noted that the locking mechanism illustrated in FIG. 16 and FIG. 17 is but one example of many locking mechanisms that may be used to secure a blanking plate and/or an SEC 106 to the front face 1502 of the smart enclosure 110. FIG. 18 illustrates three additional examples of locking mechanisms that may be used interchangeably as blanking plates and/or locking mechanisms for an SEC 106. Locking mechanism 1802 illustrates a screw-drive locking mechanism whereby turning the handle 116-1 gradually turns the screw drive, thereby causing the latches 1602-1 to extend into the bay opening 1506. Locking mechanism 1804 has a compressible interior section of the handle 116-2 to pull the latches 1602-2 out of the bay opening 1506 as the interior section of the handle 116-2 is compressed. Locking mechanism 1808 illustrates a "car door"-style locking mechanism whereby pulling handle 116-3 outwards polls the latches 1602-3 out of the bay opening 1506. Many other locking mechanisms may also be used that perform similar functions and achieve the same results as those illustrated by FIGS. 17-18. After reading this disclosure, one having skill in the art may also be able to modify existing locking mechanisms such that they would be compatible with the smart enclosure 110 and/or the SECs 106 disclosed herein.

The locking mechanism may also be electromechanical, whereby a button press, or control input from an external electronic device, will activate a motor to rotate a set of gears to extend a locking mechanism. These locking mechanisms be chamfered slightly to form a wedge shape, whereby further extension increases the force against of the bezel against the enclosure, and thereby increases the pressure on seals. A similar electromechanical system may be used to gang or assemble a number of modules together in series, or parallel, to effectively create a larger module that may be carried or otherwise managed with a single handle. The locking mechanisms on one module may engage with corresponding mechanisms on a second module to physically and electrically integrate the units. In some embodiments, an SEC 106 may include three major components: the front bezel and locking mechanism, the main battery (energy) module, and the rear interface module for power, control and management components. The battery module may have a number of connectors for power, communications, coolant, and additional connectors as needed in the front and back that allow them to be ganged together, completing their respective circuits. For manufacturing, serviceability, assembly, capacity, and other reasons, these modules may be aggregated for a complete working system. Furthermore, additional battery modules may be assembled between the front bezel and rear interface module to increase the effective electrical capacity of the assembled unit.

Figure 19:
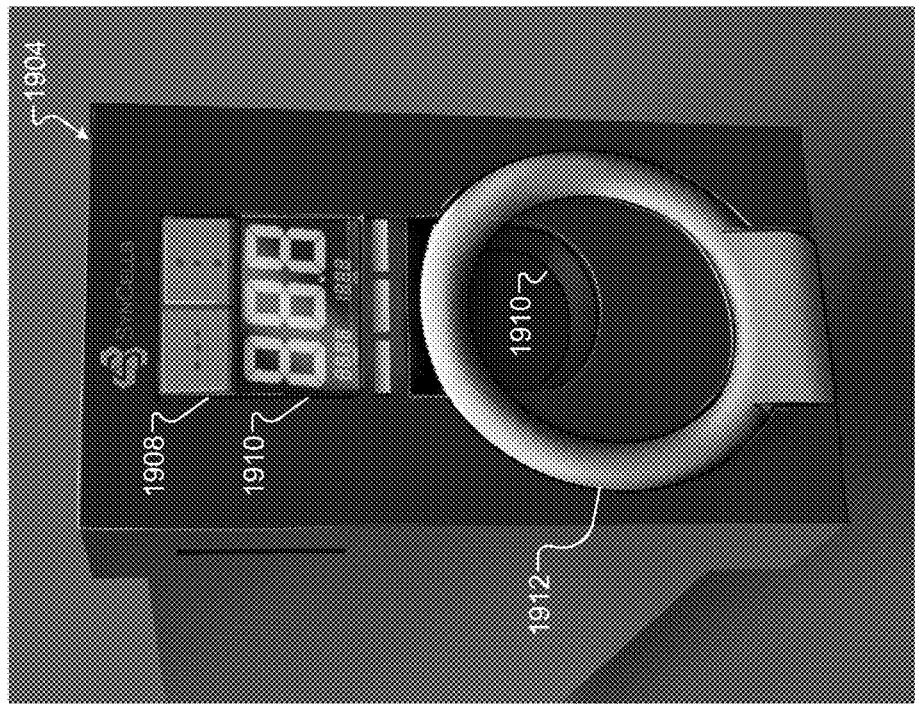
FIG. 19 illustrates example embodiments of SECs having different user interface displays.
Figure 19:
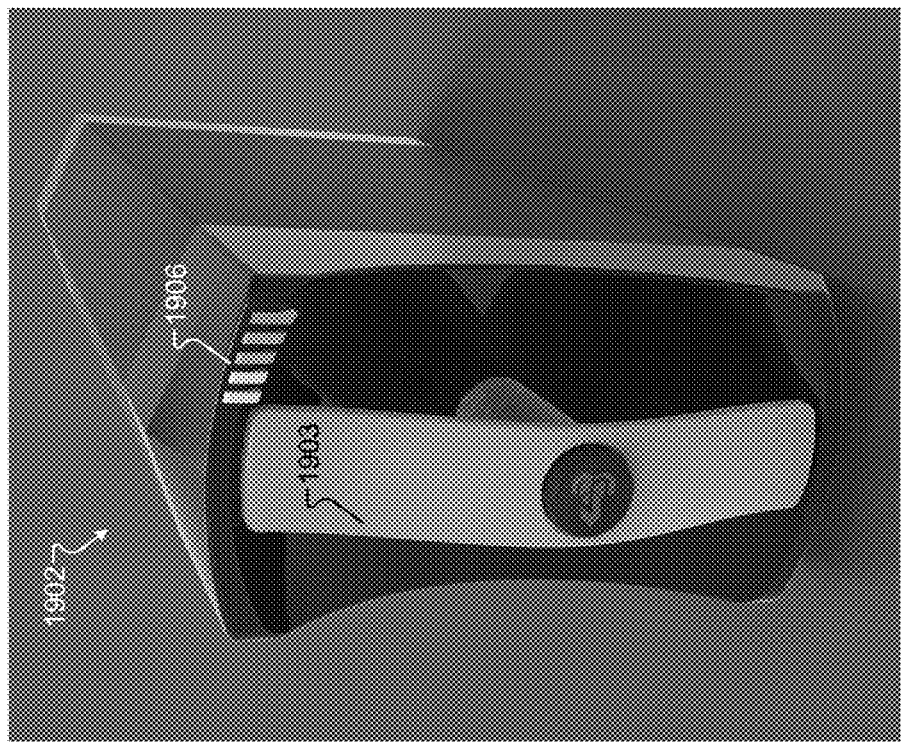

FIG. 19 illustrates example embodiments of SECs having different user interface displays. SEC 1902 includes a handle 1903 the can be rotated clockwise/counterclockwise as described above. Additionally, SEC 1902 includes a user interface element comprised of five LED-illuminated indicators 1906. The indicators 1906 can display different colors (e.g., red, green, yellow, etc.) to indicate different statuses of the SEC 1902. In some modes of operation, the number of indicators 1906 that are illuminated can be proportional to an amount charge left in the SEC 1902. The indicators 1906 can also be activated, or "blink," to indicate different status events, such as when the SEC 1902 is installed correctly, is ready to use, is installed incorrectly, is low on charge, is in an error condition, is in a dangerous condition, and so forth.

SEC 1904 includes user input elements 1908 that allow a user to interact with the SEC 1904. For example, the user input elements 1908 may include buttons, touch screens, actuatable switches, and so forth. The user input elements 1908 can be used to set an operating mode of the SEC 1904; to set operational parameters, such as current, voltage, or other configurations; to turn the SEC 1904 on/off; and so forth. The SEC 1904 also includes an electronic display 1910 that can provide more detailed information to a user, such as an amount of remaining charge, a number of total charges over the lifetime of the SEC 19104, a date of the last charge, a number of miles driven or time units left before the SEC 1904 needs to be replaced, a serial number or other identifier of the SEC 1904, and so forth.

SEC 1904 also includes an embodiment of a handle 1912 that can be used to lock, insert, and/or remove the SEC 1904 from the smart enclosure 110. A recess 1914 may be included behind the handle 1912 such that the user can insert a finger or fingers behind the handle 1912 to grip the handle 1912. After gripping the handle 1912, the user can then pull the handle 1912 outwards away from the front face of the SEC 1904. As the handle 1912 rotates on a hinge of the bottom of the front face of the SEC 1904, this rotation of the handle 1912 in an outward direction can release the latches that hold the SEC 1904 in place within the smart enclosure 110. The handle 1912 can be spring-loaded such that it retracts back into the front face of the SEC 1904 after it is released. In some embodiments, the handle 1912 can remain extended when the SEC 1904 is removed from the smart enclosure 110. When the SEC 1904 is fully inserted into the smart enclosure 110, the handle 1912 can be rotated back against/into the front face of the SEC 1904 to engage the latches that hold the SEC 1904 in place.

It will be understood that the user interface elements, indicators, and/or handles displayed in FIG. 19 are merely examples and not meant to be limiting. Other embodiments may use different user interface elements, such as touch screens, active-matrix displays, LED displays, sound speakers, microphones, voice recognition, interfaces with smart-home devices such as the Amazon Alexa®, or Google Home®, fingerprint readers, retinal scanners, cameras, and so forth.

In addition to the hybrid/electric vehicle applications that have been described above, the SEC's, smart enclosure, power subsystems, and smart power systems could also be used in a number of different applications. For example some embodiments may allow a user to transfer SEC's from the smart enclosure in their hybrid/electric vehicle and install the SEC's into a similar smart enclosure in their home or commercial office building. Thus, the SEC's can provide energy to vehicles, industrial systems, commercial systems, residential systems, mobile systems, and so forth. In seeking to address the energy challenges of the future, the embodiments described herein in provide methods of using energy virtualization to provide a hyper-converged commercial/residential energy system that can be used in many different applications and/or industries. This approach described below allows home users, commercial buildings, utilities, industrial complexes, and transportation elements to securely interoperate and complement each other to provide energy efficiency and/or energy security.

Figure 20:
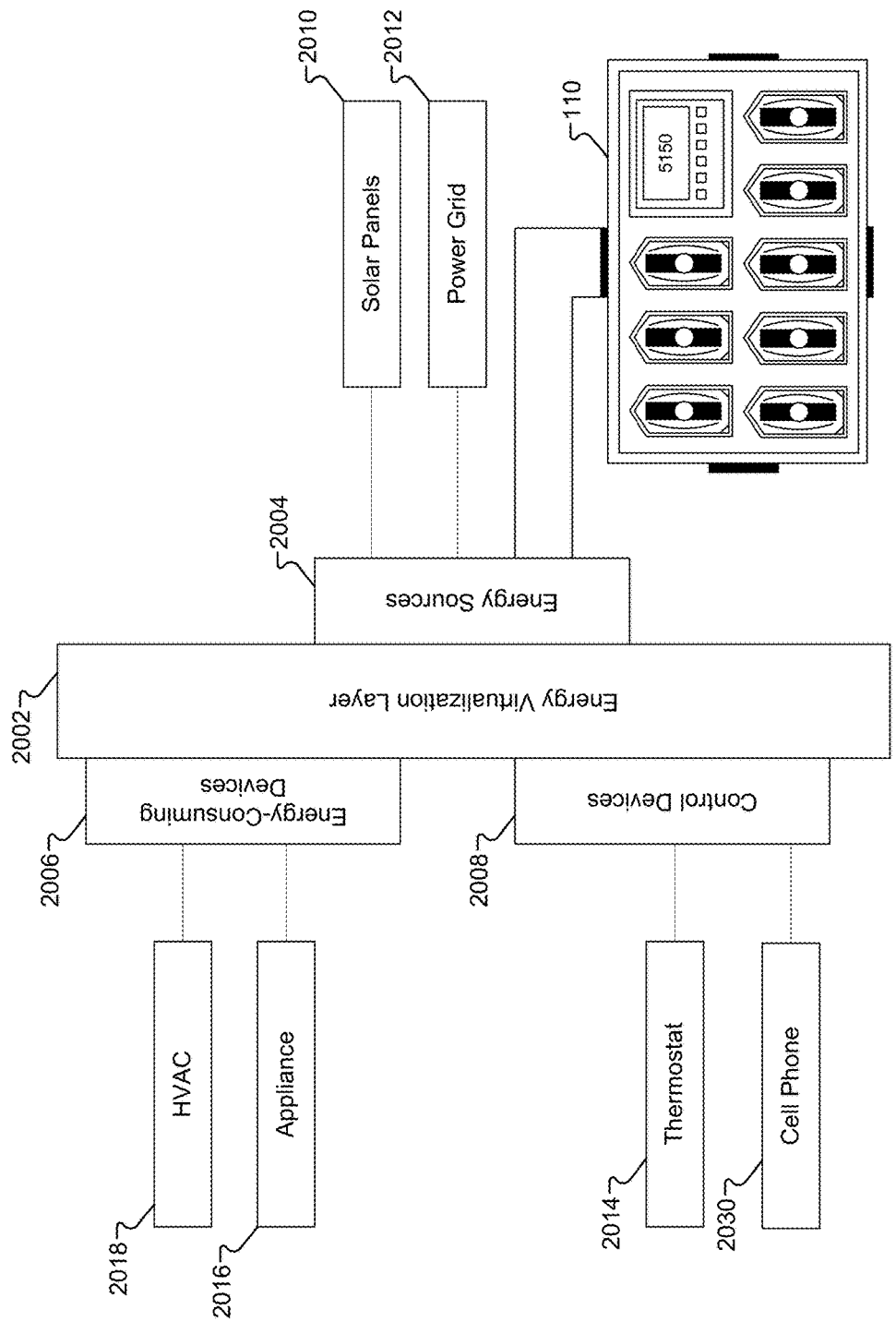
FIG. 20 illustrates an example of an energy virtualization system that is compatible with the modular power system and smart enclosure described herein, according to some embodiments.

FIG. 20 illustrates an example of an energy virtualization system that is compatible with the modular power cells and smart enclosure described herein, according to some embodiments. An energy virtualization layer 2002 can be implemented on a smart home controller or home computer in a residential installation, or in conjunction with or in place of a building management system in a commercial installation. The energy virtualization layer 2002 can manage all energy consuming devices, control devices, and energy sources by aggregating available power, determining energy needs, and distributing energy where needed. The virtualization layer abstracts the physical interfaces from the user and management interfaces, allowing other control layers and services to intercept and monitor the data flow between all. The energy virtualization layer 2002 may include a standard uniform interface for energy consuming devices 2006, an interface for control devices 2008, and an interface for energy sources 2004. Each of these uniform interfaces may receive energy and electrical inputs and/or outputs. To interface with the energy virtualization layer 2002, each device simply needs to support a connection to the standard interfaces 2004, 2006, 2008. For example, an HVAC system 2018 and smart appliances 2016 can be connected to the energy consuming device interface 2006. Control devices such as a thermostat 2014 and the smart phone 2030 can be connected to a control device interface 2008. Energy sources such as solar panels 2010 and an electrical power grid 2012 can be connected to the energy sources interface 2004.

As described above, the smart enclosure 110 and the modular power cells therein can be installed in many different applications, such as electric vehicles, mobile power stations, residential buildings, commercial buildings, and so forth. In some embodiments, the smart enclosure 110 can be connected to the energy virtualization layer 2002 of a commercial/residential installation to provide and/or receive power through the energy virtualization layer 2002. For example, when the user arrives home from a drive in an electric vehicle, the user can swap the individual SECs 106 from a smart enclosure 110 in the electric vehicle to the smart enclosure 110 of their home for connection to the energy virtualization layer 2002. Thus, the smart enclosure 110 can be configured to interface with the energy sources interface 2004 of the energy virtualization layer 2002. Any energy left in the SECs 106 can provide energy to the energy virtualization layer 2002 for distribution throughout the home. At times when the home energy needs are met by other energy sources, the energy virtualization layer 2002 can also provide energy to the SECs 106 and the smart enclosure 110 for charging battery cells. After charging, the user can again swap the SECs 106 from the smart enclosure 110 of their home and install the charged SECs 106 in the electric vehicle.

Figure 21:
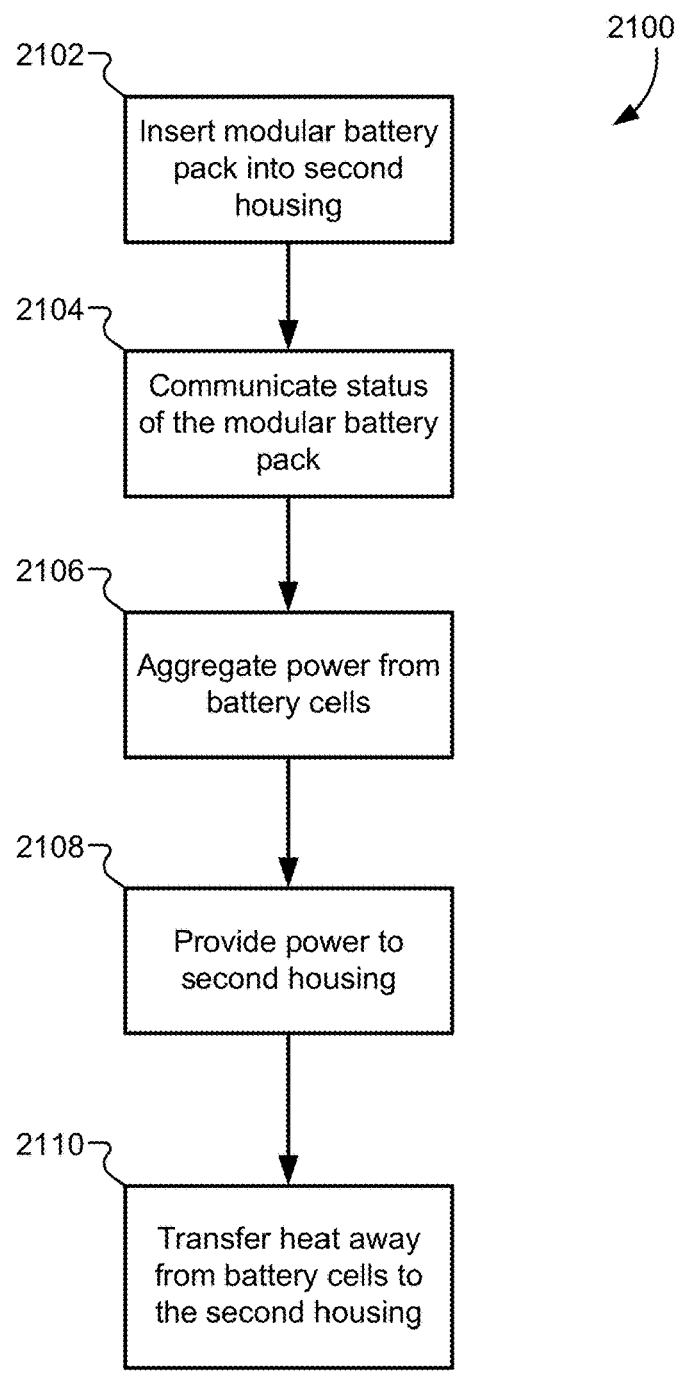
FIG. 21 illustrates a flowchart of a method for providing power through a modular battery pack, according to some embodiments.

FIG. 21 illustrates a flowchart of a method for providing power through a modular battery pack, according to some embodiments. The method may include inserting the modular battery pack into a second housing (2102). The modular battery pack may be one of the SECs described above, and the second housing may include the smart enclosures described above. The modular battery pack may include a first housing such as the housing of the SECs described above, and may have a volume of at least 0.125 cubic feet or 0.25 cubic feet. The second housing of the smart enclosure may be configured to removably receive a plurality of modular battery packs in the form of SECs.

The method may also include communicating, through a first interface of the modular battery pack, a status of the modular battery pack to the second housing (2104). The method may further include aggregating, through a processing system of the modular battery pack, power from a plurality of battery cells enclosed in the first housing (2106). The plurality of battery cells may provide at least 1 kW. Furthermore, the processing system of the modular battery pack may include the power subsystem of the SECs described above. The aggregated power may represent a DC signal transmitted from the SEC to the smart power system of the smart enclosure described above.

The method may further include providing, through a second interface of the modular battery pack, the aggregated power from the plurality of battery cells from the processing system to the second housing (2108). The first interface of the modular battery pack may include the communication port of the SEC that is connected to the smart enclosure. The second interface of the modular battery pack may include the power interface of the SEC that is connected to the smart enclosure.

The method may further include transferring heat away from the plurality of battery cells using a thermal material enclosed in the first housing (2110). The thermal material may include a thermally conductive solid, gel, and/or grease. The thermal material may also include tubing and/or liquid coolant. The thermal material may be circulated through the modular battery pack. Additionally, the thermal material may draw heat away from the battery pack and expel the heat through the first housing of the modular battery pack into the smart enclosure.

It should be appreciated that the specific steps illustrated in FIG. 21 provide particular methods of providing power through modular battery pack according to various embodiments of the present invention. Other sequences of steps may also be performed according to alternative embodiments. For example, alternative embodiments of the present invention may perform the steps outlined above in a different order. Moreover, the individual steps illustrated in FIG. 21 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 22:
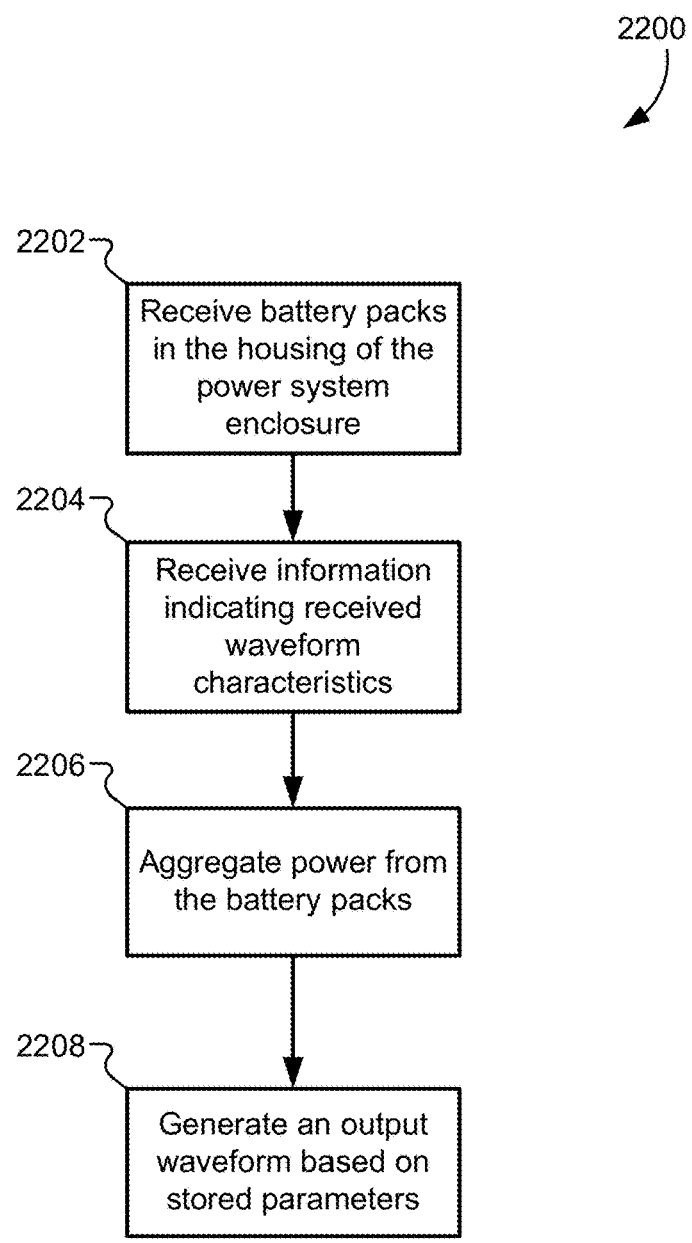
FIG. 22 illustrates a flowchart of a method for using a power system with independent battery packs to generate a defined power output, according to some embodiments.

FIG. 22 illustrates a flowchart of a method for using a power system with independent battery packs to generate a defined power output, according to some embodiments. The method may include inserting a plurality of modular battery packs into a second housing of the power system (2202). The second housing of the power system may include the smart enclosure described above, and the plurality of modular battery packs may include a plurality of SECs described above. Each of the modular battery packs may include a first housing, a plurality of battery cells, a first interface that communicates information associated with the modular battery pack, and a second interface that transmits power from the plurality of battery cells in the modular battery pack.

The method may also include receiving, at a processing system of the power system, the information from each of the plurality of modular battery packs (2204). The processing system of the power system may include the smart power system 108 described in FIG. 1 and elsewhere throughout this disclosure. The information may indicate electrical waveform characteristics for the power received from each of the modular battery packs. For example, the information may include a serial number that can be used to look up voltage/current characteristics and/or battery types for each of the SECs.

The method may additionally include causing, at a processing system of the power system, a waveform generation circuit to aggregate the power received from each of the plurality of modular battery packs according to the respective electrical waveform characteristics (2206). The method may further include causing, at a processing system of the power system, the waveform generation circuit to generate an output electrical signal based on stored parameters (2208).

It should be appreciated that the specific steps illustrated in FIG. 22 provide particular methods of using a power system with independent battery packs according to various embodiments of the present invention. Other sequences of steps may also be performed according to alternative embodiments. For example, alternative embodiments of the present invention may perform the steps outlined above in a different order. Moreover, the individual steps illustrated in FIG. 22 may include multiple sub-steps that may be performed in various sequences as appropriate to the individual step. Furthermore, additional steps may be added or removed depending on the particular applications. One of ordinary skill in the art would recognize many variations, modifications, and alternatives.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A removable modular energy pack comprising:
   a first housing;
   a plurality of energy cells enclosed in the first housing;
   a processing system enclosed in the housing that aggregates power from the plurality of energy cells;
   a first interface that communicates a status of the modular energy pack to a second housing, wherein the second housing is configured to removably receive a plurality of modular energy packs;
   a second interface that transmits the aggregated power from the plurality of energy cells from the processing system to the second housing, wherein the aggregated power from the plurality of energy cells is transmitted from the second housing to power a load that is external to the second housing; and
   a thermally conductive material enclosed in the first housing, wherein the thermally conductive material is arranged in the housing adjacent to the plurality of energy cells to transfer heat away from the plurality of energy cells and to transfer the heat to the second housing, wherein the second housing comprises a thermally conductive fluid that is circulated around the modular energy pack to absorb the heat transferred from the modular energy pack and transfer the heat away from the modular energy pack.

2. The modular energy pack of claim 1, wherein the thermally conductive material comprises an electrolyte.

3. The modular energy pack of claim 2, wherein the plurality of energy cells comprise an anode and a cathode, and wherein the electrolyte flows from the second housing into the first housing between the anode and the cathode.

4. The modular energy pack of claim 1, wherein the second housing comprises a plurality of openings, at least one of which is sealed by a blanking plate.

5. The modular energy pack of claim 1, wherein a layer of carbon nanotubes or graphene is disposed between the first housing and the second housing.

6. The modular energy pack of claim 1, further comprising an electronic screen that displays status information from the plurality of energy cells.

7. The modular energy pack of claim 1, wherein the second housing is flooded with the thermally conductive fluid when the modular energy pack is inserted into the second housing, and wherein the second housing is drained of the thermally conductive fluid before the modular energy pack is removed from the second housing.

8. The modular energy pack of claim 1, wherein the aggregated power from the plurality of energy cells is transmitted to a motor of an electric or hybrid electric vehicle.

9. The modular energy pack of claim 1, further comprising:
   a first inlet valve that mates with a first outlet valve on the second housing, wherein the thermally conductive fluid is pumped from the second housing into the first inlet valve; and
   a second outlet valve that mates with a second inlet valve on the second housing, wherein the thermally conductive fluid is pumped from the modular energy pack through the second outlet valve to the second housing.

10. The modular energy pack of claim 9, wherein:
the processing system comprises a temperature sensor; and
the processing system controls a flow of the thermally conductive fluid into the first housing based on temperature readings received from the temperature sensor.

11. A method of providing power through a modular energy pack, the method comprising:
inserting the modular energy pack into a second housing, wherein the second housing is configured to removably receive a plurality of modular energy packs;
communicating, through a first interface of the modular energy pack, a status of the modular energy pack to the second housing;
aggregating, through a processing system of the modular energy pack, power from a plurality of energy cells enclosed in a first housing;
providing, through a second interface of the modular energy pack, the aggregated power from the plurality of energy cells from the processing system to the second housing, wherein the aggregated power from the plurality of energy cells is transmitted from the second housing to power a load that is external to the second housing; and
transferring heat away from the plurality of energy cells using a thermally conductive material enclosed in the first housing, wherein the thermally conductive material is arranged in the housing adjacent to the plurality of energy cells to transfer heat away from the plurality of energy cells and to transfer the heat to the second housing, wherein the second housing comprises a thermally conductive fluid that is circulated around the modular energy pack to absorb the heat transferred from the modular energy pack and transfer the heat away from the modular energy pack.

12. The method of claim 1, wherein the thermally conductive material comprises an electrolyte.

13. The method of claim 12, wherein the plurality of energy cells comprise an anode and a cathode, and wherein the electrolyte flows from the second housing into the first housing between the anode and the cathode.

14. The method of claim 1, wherein the second housing comprises a plurality of openings, at least one of which is sealed by a blanking plate.

15. The method of claim 1, wherein a layer of carbon nanotubes or graphene is disposed between the first housing and the second housing.

16. The method of claim 1, wherein the modular energy pack further comprises an electronic screen that displays status information from the plurality of energy cells.

17. The method of claim 1, wherein the second housing is flooded with the thermally conductive fluid when the modular energy pack is inserted into the second housing, and wherein the second housing is drained of the thermally conductive fluid before the modular energy pack is removed from the second housing.

18. The method of claim 1, wherein the aggregated power from the plurality of energy cells is transmitted to a motor of an electric or hybrid electric vehicle.

19. The method of claim 1, wherein the modular energy pack further comprises:
a first inlet valve that mates with a first outlet valve on the second housing, wherein the thermally conductive fluid is pumped from the second housing into the first inlet valve; and
a second outlet valve that mates with a second inlet valve on the second housing, wherein the thermally conductive fluid is pumped from the modular energy pack through the second outlet valve to the second housing.

20. The method of claim 19, wherein:
the processing system comprises a temperature sensor; and
the processing system controls a flow of the thermally conductive fluid into the first housing based on temperature readings received from the temperature sensor.

* * * * *